(12) United States Patent
McIntosh

(10) Patent No.: US 12,035,200 B2
(45) Date of Patent: Jul. 9, 2024

(54) WAYFINDING ASSISTANCE SYSTEM FOR VISUALLY-IMPAIRED PASSENGERS

(71) Applicant: The Boeing Company, Chicago, IL (US)

(72) Inventor: Darren C McIntosh, Mulkilteo, WA (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 17/663,869

(22) Filed: May 18, 2022

(65) Prior Publication Data

US 2023/0039479 A1    Feb. 9, 2023

Related U.S. Application Data

(60) Provisional application No. 63/228,922, filed on Aug. 3, 2021.

(51) Int. Cl.
*H04W 4/024* (2018.01)
*H04W 4/48* (2018.01)
*H04W 4/80* (2018.01)

(52) U.S. Cl.
CPC ............ *H04W 4/024* (2018.02); *H04W 4/48* (2018.02); *H04W 4/80* (2018.02)

(58) Field of Classification Search
CPC .. H04W 4/024; H04W 4/021; G01C 21/3652; G01C 21/3641; B64D 2045/007; B64D 11/06
See application file for complete search history.

(56) References Cited

U.S. PATENT DOCUMENTS

2006/0247849 A1* 11/2006 Mohsini ............... G01C 21/206
                                                          701/434
2015/0330787 A1* 11/2015 Cioffi ..................... G01C 21/20
                                                          701/538
(Continued)

FOREIGN PATENT DOCUMENTS

EP    2824032 A1    1/2015
EP    3290949 A1    3/2018

OTHER PUBLICATIONS

Extended European Search Report, Application No. 22188402.6, dated Jan. 2, 2023.
(Continued)

*Primary Examiner* — Mirza F Alam
(74) *Attorney, Agent, or Firm* — Jordan IP Law, LLC

(57) ABSTRACT

Systems and methods provide technology for wayfinding assistance for visually-impaired passengers, including short-range transmitters distributed within a passenger cabin of an aircraft, a transit vehicle or a vessel, each short-range transmitter located proximate to a respective waypoint in the passenger cabin to transmit a signal identifying the respective waypoint in the passenger cabin, and a client application to, responsive to passing within a range of one of the plurality of short-range transmitters, receive a first transmission from the short-range transmitter and emit one or more of a first audible signal or a first haptic signal, based on the first transmission, as wayfinding assistance to a user of the client device. The technology can also include a mid-range transmitter located proximate to a service area in the passenger cabin, to transmit a signal providing at least one of a status of or a location of the service area.

20 Claims, 9 Drawing Sheets

(56) References Cited

U.S. PATENT DOCUMENTS

| | | | | |
|---|---|---|---|---|
| 2016/0123745 | A1 | 5/2016 | Cotier et al. | |
| 2018/0147109 | A1* | 5/2018 | Buckwalter | A61H 3/06 |
| 2019/0224049 | A1 | 7/2019 | Creasy et al. | |
| 2020/0169844 | A1* | 5/2020 | Forest | B64D 47/02 |
| 2023/0277404 | A1* | 9/2023 | Ma'as | G02B 27/01 |
| | | | | 367/116 |

OTHER PUBLICATIONS

Phys.Org, "BrailleWise aircraft toilet: Making air travel easier for visually impaired people", Feb. 4, 2013, 3 pages. <phys.org/news/2013-02-braillewise-aircraft-toilet-aireasier.html>.

Isabella Tiziana Steffan, "Universal Design Case Study: Indoor Wayfinding Systems Research, Italy", 2012, 5 pages, <artbeyondsight.org/dic/universal-design-case-study-sesamonet-secure-and-safe-mobility-network-for-visitors-who-arevisually-impaireditaly/>.

Dr. Vinod Namboodiri, "Beacon-Based Indoor Wayfinding for the Blind, Visually Impaired and Disoriented", May 19, 2020, 3 pages, Envision Research Institute.

Australian Network on Disability, "Guidance on premises Wayfinding principles and guidance", Design for Dignity Retail Guidelines, Aug. 2016, 2 pages, <designfordignity.com.au/retail-guidelines/dfd-06-03-wayfinding-principles-and-guidance.html>.

Alaska Airlines "Fly for All app helps ease anxiety of air travel", Oct. 30, 2019, 5 pages.

Dr. Vinod Namboodiri, "Smartphone Study Recruiting Participants", 2016, 1 page, <research.envisionus.com/getattachment/Projects/Indoor-Wayfinding-for-the-Blind-and-Visually-Impai/Flyer-SmartphoneStudy(Namboodiri).pdf?lang=en-US>.

Roland Hutchinson, "iCarte Turns Your iPhone Into an RFID Reader", Nov. 18, 2009, 12 pages.

Chi Thukral, "This Inclusive Urinal Design Lets Visually Impaired People Independently Use Public Restrooms", Jun. 3, 2020, 7 pages. <yankodesign.com/author/ruchie-thukral/>.

Telecommunications & Security Systems Limited, "TSL 1128 Bluetooth UHF RFID Reader", 2012, 10 pages, <tsl.com/products/1128-bluetooth-handheld-uhf-rfid-reader/>.

UGrokit, "U Grok it smartphone RFID", 2021, 2 pages, <ugrokit.com/>.

Dornob Staff, "Way-Finding Flashlight to Project Mobile Maps & Directions", 2012, 4 pages, <dornob.com/way-finding-flashlight-to-project-mobile-maps-directions/>.

Canada Application No. 3,169,363, dated Feb. 21, 2024, 5 pages.

* cited by examiner

80

81 Receiving, responsive to passing within a range of one of a plurality of short-range transmitters, a first transmission from the one of the plurality of short-range transmitters

82 Emitting one or more of a first audible signal or a first haptic signal, based on the first transmission, as wayfinding assistance to a user of the client device

83 Retrieving a seating configuration for the passenger cabin

84 Determining the seat row number corresponding to the respective waypoint based on the seating configuration

85 Receiving a second transmission from a first mid-range transmitter

86 Emitting one or more of a second audible signal or a second haptic signal indicating at least one of a status of the service area or a location of the service area relative to the client device

87 Receiving a third transmission from a second mid-range transmitter

88 Emitting one or more of a third audible signal or a third haptic signal indicating information regarding the aircraft, the transit vehicle or the vessel

FIG. 8

WAYFINDING ASSISTANCE SYSTEM FOR VISUALLY-IMPAIRED PASSENGERS

CROSS REFERENCE TO RELATED APPLICATIONS

This application claims benefit of and priority to U.S. Provisional Patent Application No. 63/228,922, filed Aug. 3, 2021, the contents of which are incorporated herein by reference in its entirety.

FIELD

The disclosure relates generally to wireless device technology. More particularly, the disclosure relates to a system for providing wayfinding assistance for visually-impaired passengers.

BACKGROUND

When traveling using a form of public or mass transportation, visually impaired passengers face substantial difficulties in navigating to a particular location in the mode of transport. Because visually-impaired passengers cannot see (or their eyesight is poor), they cannot read signs or labels indicating seat rows, seat numbers, locations of service areas, etc. For example, visually-impaired passengers generally require assistance from another person to navigate to an assigned or unoccupied seat where he or she is to sit during the trip, or to navigate to a service area such as a lavatory or food service counter. This often requires waiting for availability of a support person to provide assistance, and can result in delays and embarrassment for visually-impaired passengers. Accordingly, there is a need for improved technology to provide wayfinding assistance to visually-impaired passengers.

SUMMARY

In accordance with one or more examples, a wayfinding assistance system for visually-impaired passengers comprises a plurality of short-range transmitters distributed within a passenger cabin, the passenger cabin situated within one of an aircraft, a transit vehicle or a vessel, wherein each respective short-range transmitter of the plurality of short-range transmitters is located proximate to a different respective waypoint in the passenger cabin, and wherein each respective short-range transmitter is configured to transmit a short-range wireless signal within a short-range field identifying the respective waypoint in the passenger cabin, and a non-transitory machine-readable medium storing a client application comprising instructions for execution on a client device, wherein the client device is configured for communication with each of the plurality of short-range transmitters, and wherein the instructions, when executed, cause the client device to responsive to passing within range of a respective short-range transmitter, receive a transmission from the respective short-range transmitter, and emit one or more of an audible signal or a haptic signal, based on the received transmission from the respective short-range transmitter, as wayfinding assistance to a user of the client device.

In accordance with one or more examples, a wayfinding assistance method comprises providing a plurality of short-range transmitters distributed within a passenger cabin, the passenger cabin situated within one of an aircraft, a transit vehicle or a vessel, wherein each respective short-range transmitter of the plurality of short-range transmitters is located proximate to a different respective waypoint in the passenger cabin, and wherein each respective short-range transmitter is configured to transmit a short-range wireless signal within a short-range field identifying the respective waypoint in the passenger cabin, and providing a non-transitory machine-readable medium storing a client application comprising instructions for execution on a client device, wherein the client device is configured for communication with each of the plurality of short-range transmitters, and wherein the instructions, when executed, cause the client device to responsive to passing within range of a respective short-range transmitter, receive a transmission from the respective short-range transmitter, and emit one or more of an audible signal or a haptic signal, based on the received transmission from the respective short-range transmitter, as wayfinding assistance to a user of the client device.

In accordance with one or more examples, at least one non-transitory computer readable medium comprises instructions which, when executed by a client device, cause the client device to responsive to passing within range of a respective one of a plurality of short-range transmitters, receive a transmission from the respective short-range transmitter, and emit one or more of an audible signal or a haptic signal, based on the received transmission from the respective short-range transmitter, as wayfinding assistance to a user of the client device, wherein the plurality of short-range transmitters is distributed within a passenger cabin, the passenger cabin situated within one of an aircraft, a transit vehicle or a vessel, wherein each respective short-range transmitter of the plurality of short-range transmitters is located proximate to a different respective waypoint in the passenger cabin, and wherein each respective short-range transmitter is configured to transmit a short-range wireless signal within a short-range field identifying the respective waypoint in the passenger cabin.

In accordance with one or more examples, a wayfinding assistance system for visually-impaired passengers comprises a plurality of short-range transmitters distributed within a passenger cabin, the passenger cabin situated within one of an aircraft, a transit vehicle or a vessel, wherein each respective short-range transmitter of the plurality of short-range transmitters is located proximate to a different respective waypoint in the passenger cabin, and wherein each respective short-range transmitter is configured to transmit a short-range wireless signal within a short-range field identifying the respective waypoint in the passenger cabin, a server configured for data communication with a client device via a wireless network, the server comprising a processor and memory coupled to the processor, the memory including server instructions which, when executed by the processor, cause the server to receive, from the client device, a waypoint identifier, determine, from the waypoint identifier, wayfinding information, and send the wayfinding information to the client device, and a non-transitory machine-readable medium storing a client application comprising client instructions for execution on the client device, wherein the client device is configured for communication with the server, via the wireless network, and with each of the plurality of short-range transmitters, and wherein the client instructions, when executed, cause the client device to responsive to passing within range of a respective short-range transmitter, receive, from the respective short-range transmitter, a transmission including a waypoint identifier, send, to the server, the received waypoint identifier, receive, from the server, the wayfinding information, and emit one or more of an audible signal or a haptic signal, based on the wayfinding information, as wayfinding assistance to a user of the client device.

BRIEF DESCRIPTION OF THE DRAWINGS

The various advantages of the embodiments of the present disclosure will become apparent to one skilled in the art by reading the following specification and appended claims, and by referencing the following drawings, in which:

FIG. 8 provides a flow diagram illustrating an example method of operating a client device for use in a wayfinding assistance system according to one or more embodiments;

Accordingly, it is to be understood that the examples herein described are merely illustrative of the application of the principles disclosed. Reference herein to details of the illustrated examples is not intended to limit the scope of the claims, which themselves recite those features regarded as essential to the disclosure.

DESCRIPTION

An improved system as described herein provides wayfinding assistance for visually-impaired passengers. The technology helps improve the ability of visually-impaired passengers to navigate within a passenger cabin of a mode of transportation, while eliminating or minimizing the need for reliance on another person for support or assistance. The technology described herein is applicable to many modes of public or mass transportation, such as, e.g., aircraft, transit vehicles and/or vessels. The system is based upon deploying a set of transmitters within the passenger cabin to provide information regarding waypoints in the cabin (e.g., seat rows, service areas such as lavatories or food service counters, etc.).

Figure 1A:
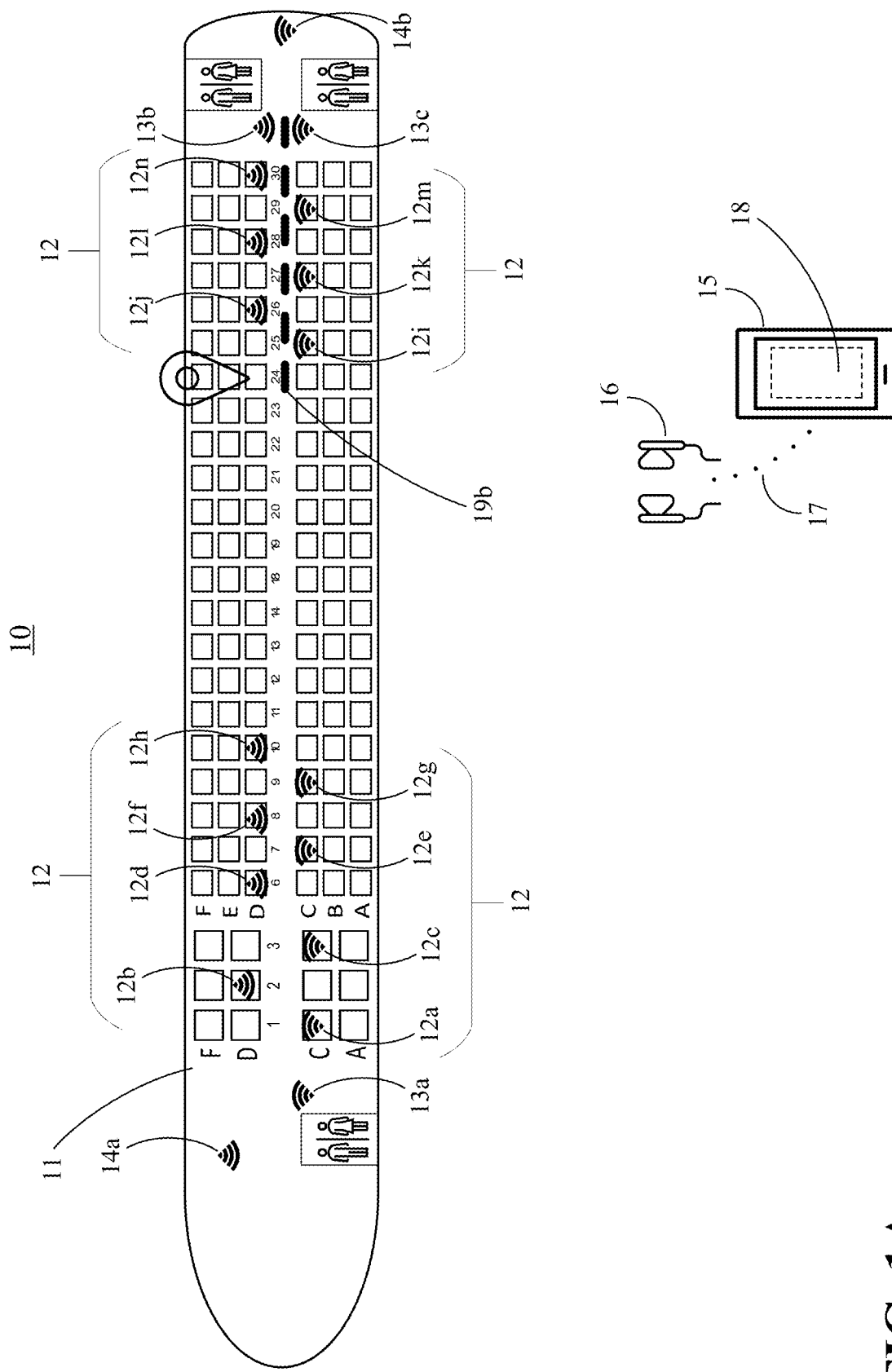
FIGS. 1A and 1B provide diagrams illustrating an example of a wayfinding assistance system according to one or more embodiments.
Figure 1B:
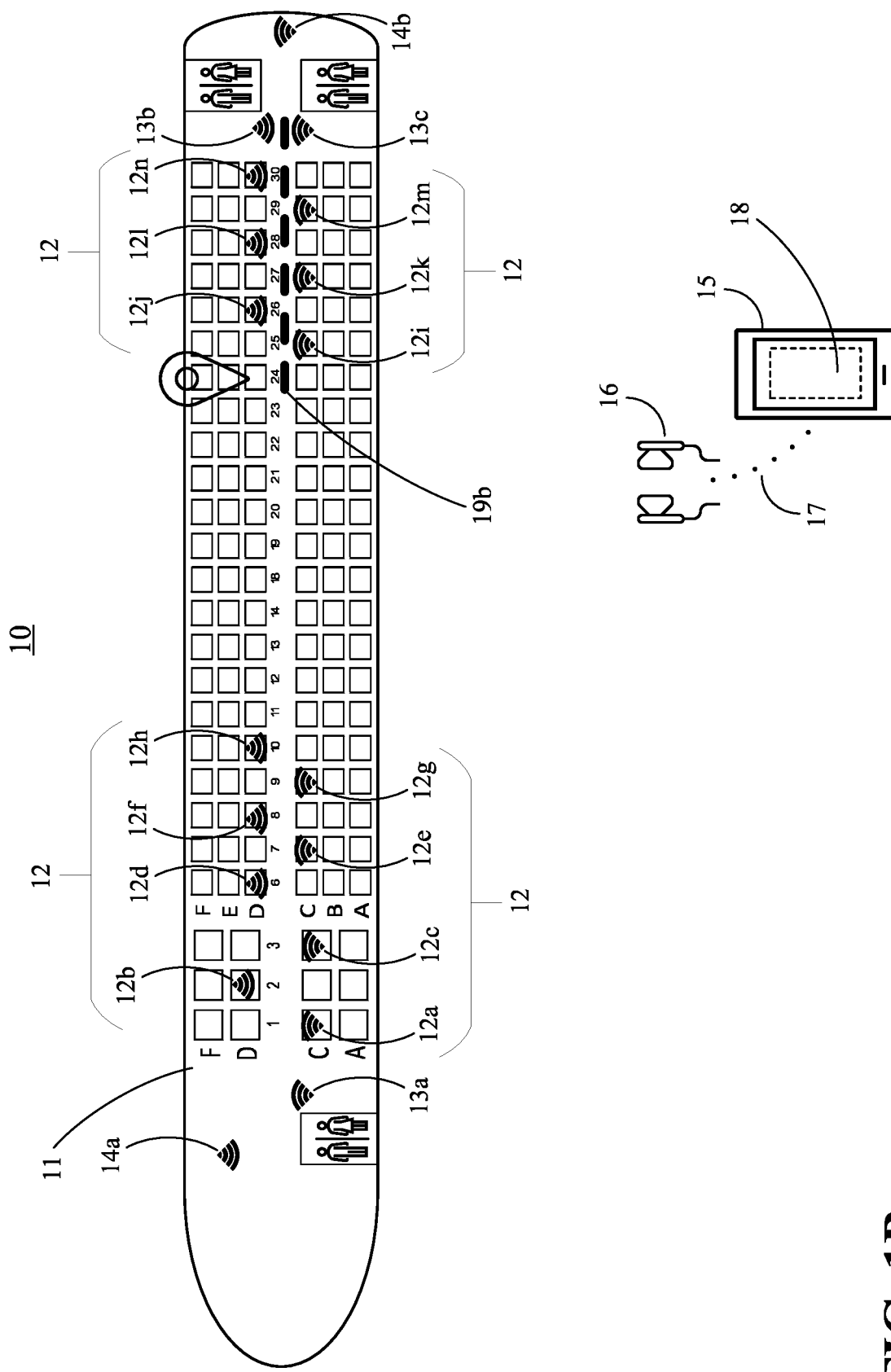

FIGS. 1A and 1B provide diagrams illustrating an example of a wayfinding assistance system 10 according to one or more embodiments, with reference to components and features described herein including but not limited to the figures and associated description. The wayfinding assistance system 10 can be installed or placed for use within a passenger cabin of virtually any type or a mode of public or mass transport. While the example shown in FIGS. 1A and 1B illustrate the wayfinding assistance system 10 installed within a passenger cabin 11 for a typical aircraft, the wayfinding assistance system 10 can also be employed in passenger cabins of other transport modes, including transit vehicles (e.g., trains, subway cars, buses, trolleys, trams, etc.) and/or vessels (e.g., cruise ships, ocean liners, or other vessels used for public transportation). As shown in FIGS. 1A-1B, the wayfinding assistance system 10 includes a set of short-range transmitters 12 (illustrated in FIGS. 1A-1B as 12a, 12b, 12c, . . . 12n). Each of the short-range transmitters 12 is installed proximate to (e.g., in proximity to) a waypoint location to provide waypoint information. As used herein, "waypoint" refers to an intermediate point or an endpoint on a route or line of travel, which includes a route or line of travel such as, e.g., a pathway of a visually-impaired passenger to a seat, lavatory, etc. within a passenger cabin, as described herein.

As shown in FIGS. 1A-1B, the short-range transmitters are shown installed in locations proximate to a seat row. For purposes of illustration, only a subset of the set of possible short range transmitters is shown in FIGS. 1A-1B. In embodiments, a short range transmitter 12 (such as short-range transmitter 12a, etc.) is installed proximate to each seat row in the passenger cabin 11. In some embodiments, the short range transmitters 12 are installed proximate to an aisle seat for every seat row. In some embodiments, as an alternative, a short range transmitter 12 (such as short-range transmitter 12a, etc.) is installed proximate to each seat in the passenger cabin 11. As shown in FIGS. 1A-1B for purposes of illustration, the short range transmitters 12 can, in some embodiments, be installed proximate to aisle seats on alternating sides of the aisle. In some embodiments, the short-range transmitters 12 can be installed proximate to an aisle seat on the same side of the aisle (e.g., either left-hand side or right-hand side). In some embodiments, the short-range transmitters 12 can be installed proximate to an aisle seat on both sides of the aisle.

The short-range transmitters 12 each have a limited transmission range (or limited field of transmission). For example, the short-range transmitters 12 can be arranged such that a receiver (e.g., as possessed or held by a user) would most likely receive a transmission from only one (or at most two) of the short-range transmitters 12 at the same time. For example, depending upon the size and configuration of the passenger cabin, a desirable transmission or reception range for each short-range transmitter 12 would be a limited range, such as, e.g., a range of about 1-2 feet, such that only one or two transmitters would be in a user's reception range at a time.

In some embodiments, each of the short-range transmitters 12 can be a passive Radio Frequency Identification (RFID) transmitter (e.g., a passive RFID tag), which typically has a range of about 1-2 feet up to several meters, depending upon the type of transmitter, the frequency used, etc. Passive RFID transmitters do not require a separate power source, which allows for greater flexibility in installation and use. Passive RFID transmitters operate on power obtained from a radio frequency field generated by the reader device. Other types of short-range transmitters can be used, depending on the passenger cabin configuration and other criteria specific to the particular installation.

Each short range transmitter 12 is configured to transmit a short range wireless signal providing a waypoint identifier corresponding to the waypoint location of the respective short range transmitter. The waypoint identifier can be used to look up information about the waypoint. For example, where the waypoint corresponds to a seat row in a passenger cabin, the waypoint identifier can be used to look up information (e.g., by retrieving a seating configuration for the passenger cabin) and determine the waypoint information (e.g., a seat row number) for the waypoint.

In some embodiments, the wayfinding assistance system 10 can also include one or more mid-range transmitters 13 (such as mid-range transmitters 13a, 13b and 13c as illustrated in FIGS. 1A-1B). Each mid-range transmitter 13 can be located proximate to a service area in the passenger cabin 11. For example, as shown in FIGS. 1A-1B, each mid-range transmitter 13 (shown as 13a, 13b and 13c) is located proximate to one of the lavatories in the passenger cabin 11. A mid-range transmitter 13 can be located proximate to other service areas, depending upon the type of transport mode and the configuration of the passenger cabin. For example, a mid-range transmitter 13 can be located proximate to a food service counter (such as, e.g., a food service counter located in a passenger train). The transmission (or reception) range of each of the mid-range transmitters 13 can be selected based on the passenger cabin configuration and the particular coverage are to be included. For example, for a passenger flight the range can be selected to cover the entire passenger cabin 11. In some embodiments, the range can be selected to cover just a portion of the passenger cabin 11 (e.g., a specific area such as first class, business class, economy class, etc.).

In some embodiments, each of the mid-range transmitters 13 can be an active RFID transmitter. Active RFID transmitters require a power source and generally have a range greater than the range of passive RFID transmitters. An active RFID transmitter can have a range of up to about 100-150 meters, depending upon the type of transmitter, the frequency used, etc. Because the mid-range transmitters are located proximate to a service area, there is commonly a power source available to provide necessary power for an active RFID transmitter. Alternatively, power for an active RFID transmitter can be supplied by a battery.

Each mid-range transmitter 13 is configured to transmit a mid-range wireless signal providing waypoint or other information relating to the respective service area, including, for example, a waypoint identifier (e.g., identifying a particular service area such as a particular lavatory). For example, a mid-range transmitter 13 can be configured to transmit information relating to at least one of a status of or a location of the service area. Thus, in the example installation of FIGS. 1A-1B, where each of the mid-range transmitters 13 (e.g., 13a, 13b, and 13c) is located proximate to a lavatory in the passenger cabin 11, each mid-range transmitter 13 can be configured to transmit information regarding the location of the respective lavatory (e.g., aft lavatory behind row 30, on the right-hand side of the aircraft) and/or a status of the respective lavatory (e.g., open or occupied). As another example, a mid-range transmitter 13 can be located proximate to a food service counter to provide information regarding the location of the food service counter and a status of the food service counter (e.g., open, serving food, serving drinks or snacks, etc.).

In some embodiments, any one or more of the mid-range transmitters 13 can be coupled or connected to a signal line associated with the respective service area. For example, a mid-range transmitter 13 that is located proximate to a lavatory can be coupled or connected to a signal line for a status indicator for the lavatory (e.g., open or occupied).

In some embodiments, the wayfinding assistance system 10 can also include one or more mid-range transmitters 14 (such as mid-range transmitters 14a and 14b as illustrated in FIGS. 1A-1B). The mid-range transmitters 14 can be located in one or more locations in the passenger cabin 11. For example, as shown in FIG. 1A, each mid-range transmitter 14 (shown as 14a and 14b) is located proximate to an end of the passenger cabin 11. The transmission (or reception) range of each of the mid-range transmitters 14 can be selected based on the passenger cabin configuration and the particular coverage are to be included. For example, for a passenger flight the range can be selected to cover the entire passenger cabin 11. In some embodiments, the range can be selected to cover just a portion of the passenger cabin 11 (e.g., a specific area such as first class, business class, economy class, etc.). In some embodiments, each of the mid-range transmitters 14 can be an active RFID transmitter. In some embodiments, other types of transmitters can be used for one or more of the mid-range transmitters 14. For example, one or more of the mid-range transmitters 14 can be a transmitter configured to transmit wireless fidelity (WiFi) wireless signals.

Each mid-range transmitter 14 is configured to transmit a mid-range wireless signal providing information regarding the particular mode of transportation (e.g., the aircraft, the transit vehicle or the vessel). For example, a mid-range transmitter 14 can be configured to transmit information regarding the particular trip (e.g., a number indicating the particular flight or route, destination arrival time, etc.). As another example, on an aircraft, a mid-range transmitter 14 can configured to transmit information regarding the particular flight such as, e.g., flight number, destination city, arrival time, local time, seat belt indicator status (e.g., seat belt warning "on"), etc. As another example, a mid-range transmitter 14 can be connected to an attendant control panel (such as an Attendant Control Panel in an aircraft) to provide information regarding a food service cart (such as, e.g., a mobile cart used on passenger flights), for example, status information (e.g., serving a meal, serving drinks or snacks, etc.) and/or current location information (e.g., a location of the cart in the aisle adjacent to a particular row of the passenger cabin 11, thus blocking the aisle and potentially rendering a lavatory temporarily inaccessible).

In some embodiments, one or more of the mid-range transmitters 14 can be coupled or connected to a signal line for the seat belt indicator. In some embodiments, one or more of the mid-range transmitters 14 can be coupled or connected to a signal line (or signal) for an information/entertainment system feed (such as, e.g., an in-flight entertainment system).

The wayfinding assistance system 10 also includes one or more client devices 15, each client device 15 for use by an individual visually-impaired passenger. The client device 15 can include a smart phone (such as an iPhone or an Android phone) or similar communication device that has been adapted or configured as described herein. The client device 15 as so configured is for use by a visually-impaired passenger in conjunction with the other components of the wayfinding assistance system 10. The client device 15 can include headphones 16 (e.g., ear buds or earphones) to provide audio sounds or signals to the user. The headphones 16 can be connected to the client device 15 via a connection 17 such as a standard cord or cable or a wireless connection (e.g., via a Bluetooth connection). The client device is configured for data communication with each of the set of short range transmitters 12. In embodiments, the client device 15 is also configured for data communication with the one or more mid-range transmitters 13 and the one or more mid-range transmitters 14. The client device 15 includes a client application 18, which is a set of instructions to carry out the functions of the client device in operation with the wayfinding assistance system 10 as described herein. The client device 15 includes non-transitory memory to store the client application 18. When executing (e.g., running) the client application 18, the client device 15 is configured to receive a transmission from the respective short-range transmitter 12. The transmission is received in response to the client device 15 passing within range of a respective short-range transmitter 12. Additionally, when executing the client application 18, the client device 15 is configured to emit at least one of an audible signal or a haptic signal, based on the received transmission from the respective short-range transmitter 12, as wayfinding assistance to a user of the client device 15. A haptic signal can include vibrations emitted by the client device 15. Further information regarding the client device 15 is provided herein, including description below with respect to FIGS. 6 and 7.

In operation, the wayfinding assistance system 10 provides wayfinding assistance to a visually-impaired passenger using the client device 15. The client application 18 can include, or be provided with, information regarding the seat number assignment for the visually-impaired passenger. In embodiments, the client application 18 can determine the seat assignment for the visually-impaired passenger via communication with a passenger manifest system. As an example, shown in FIG. 1A is a pathway 19a for the visually-impaired passenger to enter the passenger cabin and proceed to an assigned seat, indicated by the destination waypoint symbol (⁂-- which corresponds to row 9 seat D in the illustration of FIG. 1A). The visually-impaired passenger uses a client device 15 (which can be held or carried by the visually-impaired passenger, e.g. in a pocket or holder attached via a belt, strap, etc.). Using the client device 15, the visually-impaired passenger enters the passenger cabin 11 and receives an indication to turn right and proceed down the aisle toward his or her assigned seat. Upon passing within range of the short-range transmitter 12a, the client device 15 receives a transmission from the short-range transmitter 12a indicating a waypoint corresponding to the location of the short-range transmitter 12a. As an example based on the illustration in FIG. 1A, the transmission from the short-range transmitter 12a indicates that the visually-impaired passenger is adjacent to row 1 of the passenger cabin 11. In some embodiments, the transmission from the short-range transmitter 12a includes an identifier for the waypoint corresponding to the location of the short-range transmitter 12a, and the client device, via the client application 18, determines a seat row number based on the waypoint identifier. In some embodiments, the client application 18 retrieves or otherwise accesses a seating configuration for the passenger cabin 11, where the seat row number can be determined based on the seating configuration. The seating configuration can be specific to the type or model of transport (e.g., a type or model of an aircraft), the trip number (e.g., flight number), etc. In embodiments, the client application 18 has the seating configuration pre-loaded for the specific trip (e.g., provided when the trip reservation is made). The client device 15, via the client application 18, emits sounds indicating that the visually-impaired passenger has reached row 1. The sounds can be emitted through the headphones 16. For example, the client device can provide an audible statement such as "Row 1," or "You have reached Row 1," or the like. In embodiments, the client device additionally or alternatively emits a haptic signal (e.g., a vibration or series of vibrations).

Continuing down the aisle, the visually-impaired passenger passes within range of the short-range transmitter 12b, and the client device 15 receives a transmission from the short-range transmitter 12b indicating a waypoint corresponding to the location of the short-range transmitter 12b. As an example based on the illustration in FIG. 1A, the transmission from the short-range transmitter 12b indicates that the visually-impaired passenger is adjacent to row 2 of the passenger cabin 11. The client device 15, via the client application 18, emits an audible statement that the visually impaired passenger has reached row 2. In embodiments, the client device 15 additionally or alternatively emits a haptic signal (e.g., vibration or series of vibrations). As the visually-impaired passenger continues down the aisle, he/she passes within range, sequentially, of the short-range transmitters 12c, 12d, 12e and 12f (corresponding to rows 3, 6, 7 and 8 as illustrated in FIG. 1A) and, when adjacent to each respective short-range transmitter 12, the client device receives a transmission from the respective short-range transmitter 12 and emits an audible statement that the visually-impaired passenger is adjacent to row 3, row 6, row 7 and then row 8. In embodiments, the client device 15 additionally or alternatively emits a haptic signal (e.g., vibration or series of vibrations) at each location.

As illustrated in FIG. 1A, the short-range transmitter 12g corresponds to row 9, which is the destination row for the visually-impaired passenger (with seat assignment 9D in the illustrated example). Upon passing within range of the short-range transmitter 12g, the client device 15 receives a transmission from the short-range transmitter 12g, indicating that the visually-impaired passenger is now adjacent to row 9. The client device 15 via the client application 18 identifies that this row is the destination row based on the assigned seat of the visually-impaired passenger. The client device 15 emits an audible statement to the visually-impaired passenger announcing that he/she has reached the assigned row. For example, the client device 15 can emit an audible statement such as "You have reached Row 9—This is your seat row, you are seated on the RH aisle, Welcome Aboard!" In embodiments, the client device 15 can additionally or alternatively emit a haptic signal (e.g., a long or continuous set of vibrations indicating the visually-impaired passenger has reached the destination row). The visually-impaired passenger can accordingly be seated in his/her assigned seat 9D.

As another example, shown in FIG. 1B is a pathway 19b for a visually-impaired passenger to travel along the aisle in the passenger cabin and proceed from another assigned seat, indicated by the destination waypoint symbol (⁂-- which corresponds to row 24 seat D in the illustration of FIG. 1B) to a lavatory in the aft section (past row 30) of the passenger cabin 11. For example, the client device 15 can receive a transmission from one or more of the mid-range transmitters 13 to determine location of service areas (e.g., lavatories). In some embodiments, the client application 18 retrieves or otherwise accesses a service area configuration for the passenger cabin 11, where the service area location can be determined based on the service area configuration. The service area configuration can be specific to the type or model of transport (e.g., a type or model of an aircraft), the trip number (e.g., flight number), etc. Using a client device 15, the visually-impaired passenger can determine, e.g., that one or both of the aft lavatories are open (e.g., unoccupied and available for use). The visually-impaired passenger starts down the aisle toward the aft section of the passenger cabin 11. As the client device 15 passes within range of the short-range transmitter 12*i*, the client device 15 receives a transmission from the short-range transmitter 12*i*, indicating that the visually-impaired passenger is now adjacent to row 25. The client device 15 emits an audible statement to the visually-impaired passenger indicating row 25. In embodiments, the client device 15 additionally or alternatively emits a haptic signal (e.g., vibration or series of vibrations). Continuing down the aisle, the visually-impaired passenger passes within range, sequentially, of the short-range transmitters 12*j*, 12*k*, 12*l*, 12*m* and 12*n* (corresponding to rows 26, 27, 28, 29 and 30 as illustrated in FIG. 1B) and, when adjacent to each respective short-range transmitter 12, the client device receives a transmission from the respective short-range transmitter 12 and emits an audible statement that the visually-impaired passenger is adjacent to row 26, row 27, row 28, row 29 and then row 30. In embodiments, the client device 15 additionally or alternatively emits a haptic signal (e.g., vibration or series of vibrations) at each location.

Upon reaching row 30, the client device 15 communicates with one of the mid-range transmitters 13 (e.g., mid-range transmitter 13*b*) and receives further information regarding the location to the lavatory (adjacent to mid-range transmitter 13*b*) relative to the client device. The client device emits an audible statement guiding the visually-impaired passenger to the entrance to the lavatory. For example, the client device 15 can emit an audible statement that the lavatory ahead and to the left is open and available. The visually-impaired passenger can return to his/her assigned seat by proceeding back up the aisle, receiving audible assistance from the client device 15 as he/she passes within range of each respective short-range transmitter, as before.

In embodiments, the visually-impaired passenger can query the client device 15 and receive information regarding the location and/or status of any service area in the passenger cabin 11. The client device 15 can receive transmissions from each of the mid-range transmitters 13 to obtain the location and status information to be provided to the visually-impaired passenger. For example, as illustrated in FIG. 1B, the client device can receive transmissions from mid-range transmitters 13*a*, 13*b* and 13*c*, corresponding to a forward lavatory and two aft lavatories. The information can include the location of each lavatory (e.g., forward of row 1 or behind row 30) and a status of each lavatory (e.g., open or occupied).

In embodiments, the visually-impaired passenger can query the client device 15 and receive information (as transmitted to the client device 15 by the one or more mid-range transmitters 14) regarding the particular trip. For example, the client device can emit audible statements providing information such as e.g., a number indicating the particular flight or route, the destination city, destination arrival time, time to destination, etc. As another example, on an aircraft, the client device 15 can provide audible information regarding the particular flight such as, e.g., flight number, destination city, arrival time, local time, seat belt indicator status (e.g., seat belt warning "on"), etc. In embodiments, the client device can emit an audible alert if there is a change (e.g., a change in the seat belt indicator, e.g., warning of rough weather ahead). In embodiments, the client device 15 can provide further audible information or entertainment content provided from an information/entertainment system via a mid-range transmitter 14.

In embodiments, the client device 15 can provide specific audible signals or statements, based on the received transmissions from any one or more of a short-range transmitter 12, a mid-range transmitter 13, or a mid-range transmitter 14, such as one or more of the following (as examples):

"Row 1", "Row 2", "Row 3", etc.

"Row 9—This is your seat row, you are seated on the RH aisle, Welcome Aboard!"

"The forward lavatory is occupied, but the aft lavatories are available."

"The forward lavatory is available."

"The lavatory to your left is available."

"Meal or drink service in progress, the aisle is blocked, lavatories cannot be accessed at this time."

"The fasten seat belt sign is on, please remain seated, lavatories cannot be accessed at this time."

Other audible messages can be provided to indicate trip information (e.g., flight status or other flight information). For example, audible statements such as the following can be provided.

"Time to destination, 1 hour and 33 minutes."

"Estimated arrival time is 6:38 PM."

"The current local time at destination is 5:05 PM."

Additionally or alternatively, the client device 15 can emit haptic signals, based on the received transmissions, that correspond to specific haptic codes (e.g., specific patterns or intervals of vibrations) indicating a specific message. For example, when approaching a desired destination the vibrations may be sent in increasing rate or frequency until the destination is reached, at which point the vibrations can be continuous or near-continuous.

It will be understood that the functionality of the client device 15 as described herein can be provided via the client application 18 operating on the client device 15 and interfacing with the various components of the client device 15.

Figure 2:
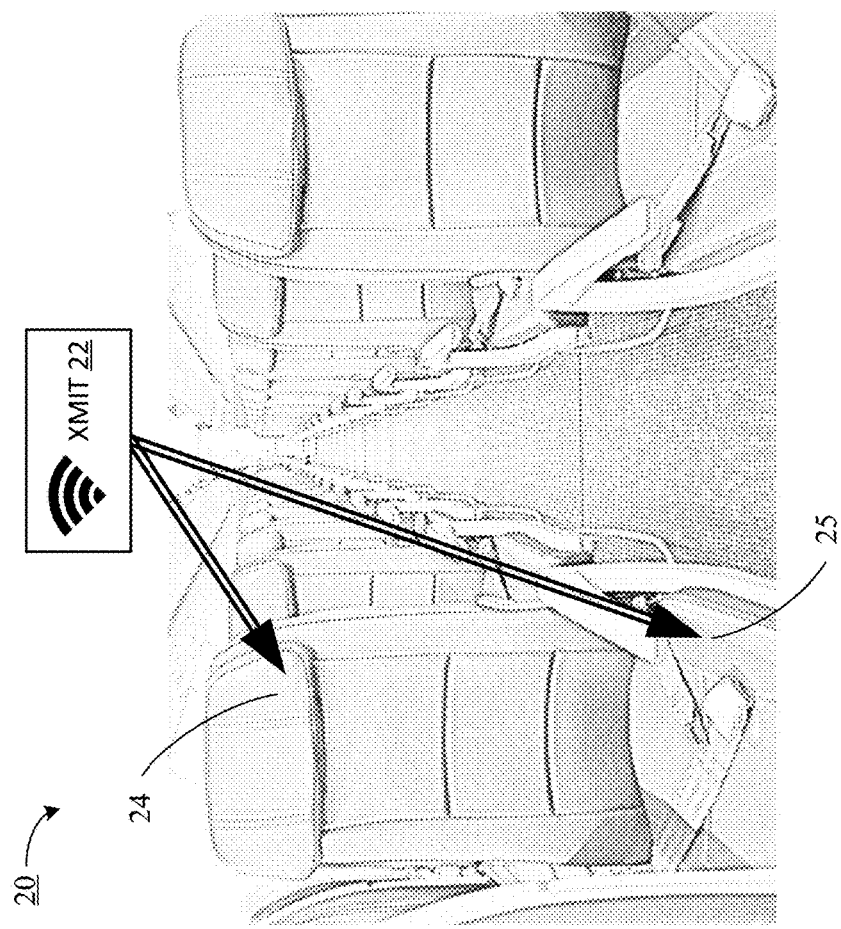
FIG. 2 provides a diagram illustrating an example seating arrangement for installing short-range transmitters according to one or more embodiments.

Turning now to FIG. 2, a diagram is provided illustrating an example seating arrangement 20 for installing short-range transmitters according to one or more embodiments, with reference to components and features described herein including but not limited to the figures and associated description. The example seating arrangement 20 can be used in a passenger cabin of any transportation mode, such as the passenger cabin 11 for an aircraft (FIGS. 1A-1B, already discussed). A short-range transmitter 22 is shown in FIG. 2 with arrows indicating some of the potential installation locations for the transmitter. The short-range transmitter 22 corresponds to any one of the short-range transmitters 12 as illustrated in FIGS. 1A-1B (already discussed). As an example, a short-range transmitter 22 can be installed proximate to each row in the passenger cabin. Each short-range transmitter 22 can be, e.g., a passive RFID transmitter which can, in examples, be provided as a roll or strip of sequentially-numbered RFID transmitters. Each numbered RFID transmitter can correspond to a particular seat row (or seat). As illustrated in FIG. 2, example installation placements for the short-range transmitter 22 can include behind a seat headrest 24 or underneath a seat cushion 25. As another alternative, the short-range transmitter 22 can be placed within or adjacent to an armrest on the aisle side of the seat. Other placements for the short-range transmitter 22 are possible, depending upon the particular seating design and arrangement, choice of short-range transmitter 22, etc. In embodiments, the respective short-range transmitters 22 as installed are hidden from view, providing a sense of privacy for visually-impaired passengers.

Figure 3:
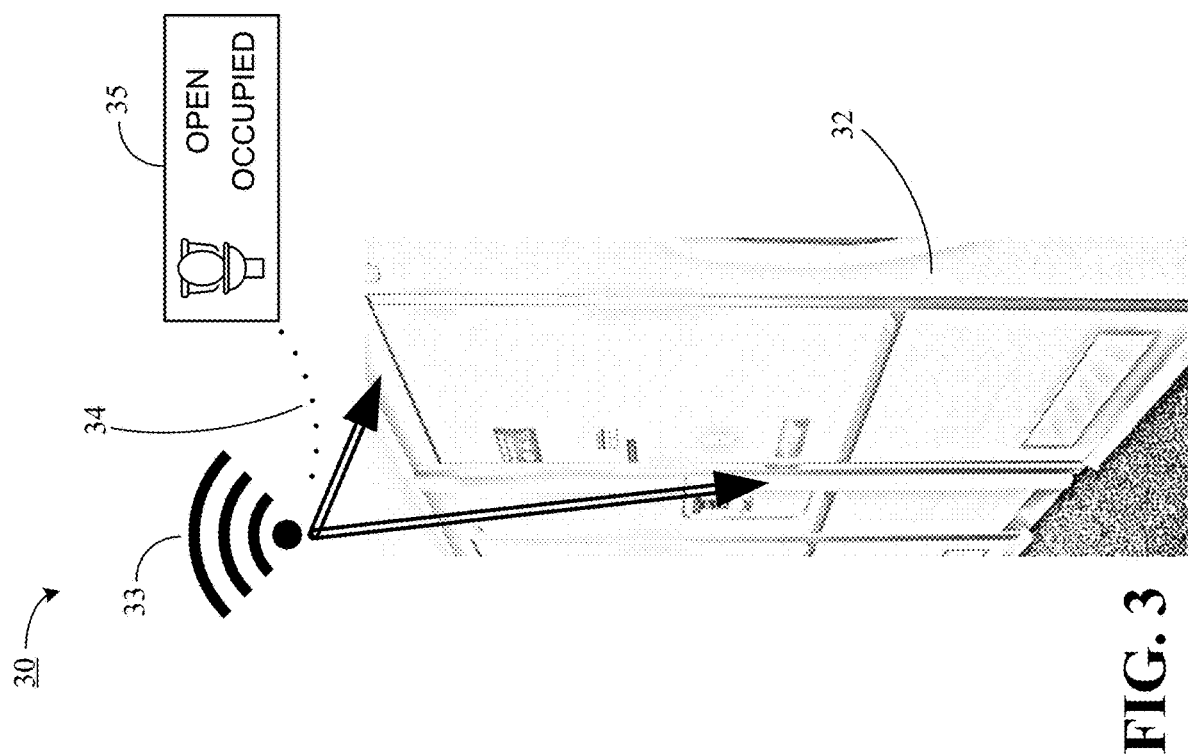
FIG. 3 provides a diagram illustrating an example lavatory arrangement for installing a mid-range transmitter according to one or more embodiments.

Turning now to FIG. 3, a diagram 30 is provided illustrating an example lavatory arrangement 32 for installing a mid-range transmitter according to one or more embodiments, with reference to components and features described herein including but not limited to the figures and associated description. The example lavatory arrangement 32 can be used in a passenger cabin of any transportation mode having lavatory facilities, such as the passenger cabin 11 for an aircraft (FIGS. 1A-1B, already discussed). A mid-range transmitter 33 is shown in FIG. 3 with arrows indicating some of the potential installation locations for the transmitter. The mid-range transmitter 33 corresponds to any one of the mid-range transmitters 13 as illustrated in FIGS. 1A-1B (already discussed). As an example, a mid-range transmitter 33 can be installed proximate to each lavatory in the passenger cabin. Each mid-range transmitter 33 can be, e.g., an active RFID transmitter. As illustrated in FIG. 3, example installation locations for the mid-range transmitter 33 can include above the lavatory doorway, or on the side of the doorway. Other placements for the mid-range transmitter 33 are possible, depending upon the particular lavatory design and arrangement, choice of mid-range transmitter 33, etc. In embodiments, the mid-range transmitter 33 is coupled or connected to a lavatory indicator signal 35, which indicates whether the lavatory is open or occupied. In some embodiments, a connection 34 between the mid-range transmitter 33 and the lavatory indicator signal 35 is made through a wired connection. In some embodiments, the wired connection also includes a connection to power to provide a power source for the mid-range transmitter 33. In some embodiments, the connection 34 between the mid-range transmitter 33 and the lavatory indicator signal 35 is made through a wireless connection. In embodiments, the mid-range transmitter 33 as installed is hidden from view, providing a sense of privacy for visually-impaired passengers.

Figure 4:
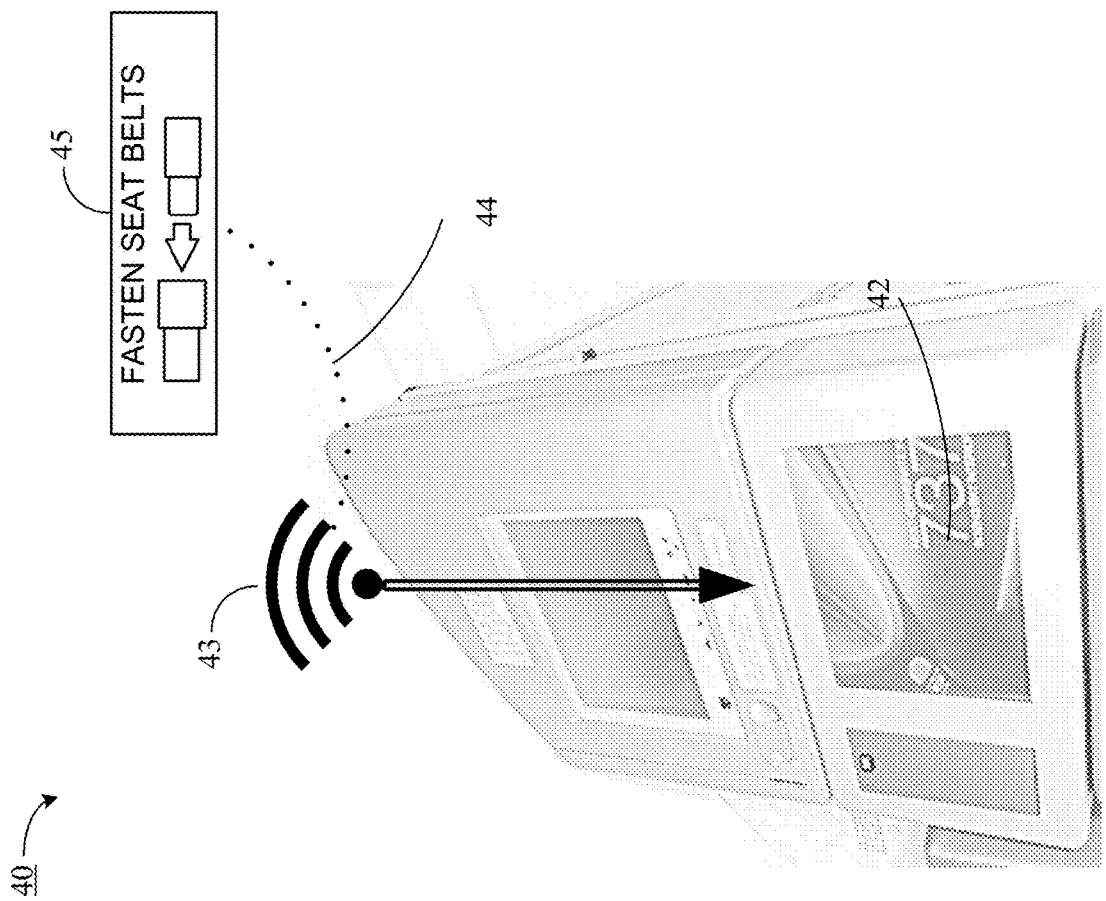
FIG. 4 provides a diagram illustrating an example attendant control panel for installing a mid-range transmitter according to one or more embodiments.

Turning now to FIG. 4, a diagram 40 is provided illustrating an example attendant control panel 42 for installing a mid-range transmitter according to one or more embodiments, with reference to components and features described herein including but not limited to the figures and associated description. The example attendant control panel 42 can be any attendant control panel used in a passenger cabin of any transportation mode, such as the passenger cabin 11 for an aircraft (FIGS. 1A-1B, already discussed). For example, in an aircraft, the attendant control panel 42 can be located near the front of the passenger cabin (such as the passenger cabin 11 in FIGS. 1A-1B, already discussed). Additionally or alternatively, an attendant control panel 42 can be located near the aft section of the passenger cabin. A mid-range transmitter 43 is shown in FIG. 4 with an arrow indicating a potential installation location for the transmitter; other locations are possible. As an example, a mid-range transmitter 43 can be installed proximate to any attendant control panel 42 location in the passenger cabin. The mid-range transmitter 43 corresponds to any one of the mid-range transmitters 14 as illustrated in FIGS. 1A-1B (already discussed). Thus, the mid-range transmitter 43 can be, e.g., an active RFID transmitter.

The mid-range transmitter 43 can be coupled or connected to the attendant control panel 42, and is configured to transmit information regarding the aircraft, the transit vehicle or the vessel, including status information regarding services such as food service (e.g., meal or drink services). For example, when a drink or meal service is being conducted on an aircraft, an attendant can indicate a food service status via the attendant control panel 42, and this information can also be transmitted via the mid-range transmitter 43 to notify any passengers using a client device 15 that the aisle is blocked by a food service cart and the lavatories cannot be accessed. As an example, when the client device 15 receives a transmission from the mid-range transmitter 43, the client device 15 can emit an audible statement advising the visually-impaired passenger of the status of the food service, e.g., a phrase such as "Meal or drink service in progress, aisle is blocked, lavatories cannot be accessed at this time." In embodiments, the client device 15 additionally or alternatively emits a haptic signal (e.g., vibration or series of vibrations, such as a code including, e.g., long dash-short dot-long dash). When food service is complete, an attendant can indicate this food service status via the attendant control panel 42, and this information can also be transmitted via the mid-range transmitter 43 to notify any passengers using a client device 15 that food service is complete and that the food service cart is no longer blocking the aisle.

In embodiments, the mid-range transmitter 43 is coupled or connected to a seat belt indicator signal 45, which indicates a seat belt fasten status (e.g., whether seat belts are required to be fastened at the particular time). In some embodiments, a connection 44 between the mid-range transmitter 43 and the seat belt indicator signal 45 is made through a wired connection. In some embodiments, the wired connection also includes a connection to power to provide a power source for the mid-range transmitter 43. In some embodiments, the connection 44 between the mid-range transmitter 43 and the seat belt indicator signal 45 is made through a wireless connection. In embodiments, the mid-range transmitter 43 as installed is hidden from view, providing a sense of privacy for visually-impaired passengers.

Figure 5:
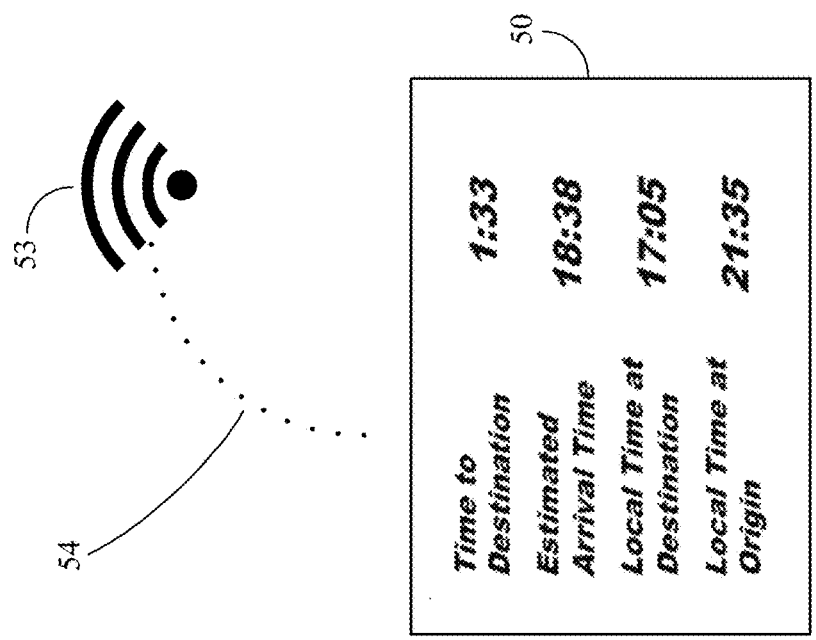
FIG. 5 provides an illustration of an example information screen for an information system according to one or more embodiments.

FIG. 5 illustrates an example information screen 50 for an information system according to one or more embodiments, with reference to components and features described herein including but not limited to the figures and associated description. The information screen 50 illustrates example information provided by an information/entertainment system feed (such as, e.g., an in-flight entertainment system). The information can include, for example, a time until the destination is reached, an estimated arrival time, the local time at the destination, local time at the trip origin location, etc. Additionally, information such as weather at the destination can be provided. A mid-range transmitter 53 is coupled or connected to a signal line (or signal) for the information/entertainment system feed (such as, e.g., an in-flight entertainment system), via a connection 54. The connection 54 can be a wired or wireless connection. The mid-range transmitter 53 corresponds to a mid-range transmitter 14 (FIGS. 1A-1B, already discussed). In some embodiments, the mid-range transmitter 53 can correspond to the mid-range transmitter 43. In embodiments, the mid-range transmitter 53 can be an active RFID transmitter. In some embodiments, the mid-range transmitter 53 can be a WiFi transmitter to provide WiFi signals. The mid-range transmitter 53 provides information regarding the aircraft, the transit vehicle or the vessel from the information/entertainment system feed (including information such as shown in the information screen 50) via transmission to a client device 15. Upon receiving information via the mid-range transmitter 53, the client device 15 can provide the information as audible signals or statements to a visually-impaired passenger.

In embodiments, for an aircraft, the mid-range transmitter 53 is coupled or connected to, or otherwise receives information (via an in-flight entertainment system) from, a real-time moving-map system that is in place in many modern aircraft, and provides such information via transmission to a client device 15. The moving-map system information is derived in real-time from the aircraft's flight computer system. Examples of a moving-map system include systems such as: AdonisOne IFE; ICARUS Moving Map Systems; Airshow 4200 by Rockwell Collins (or Collins); iXlor2 by Panasonic Avionics; or JetMap HD by Honeywell Aerospace; and FlightPath3D by Betria Interactive. In some embodiments, for an aircraft, the mid-range transmitter 53 may additionally, or alternatively, be coupled or connected to a flight computer system of the aircraft and provide information from the flight computer system via transmission to a client device 15.

Figure 6:
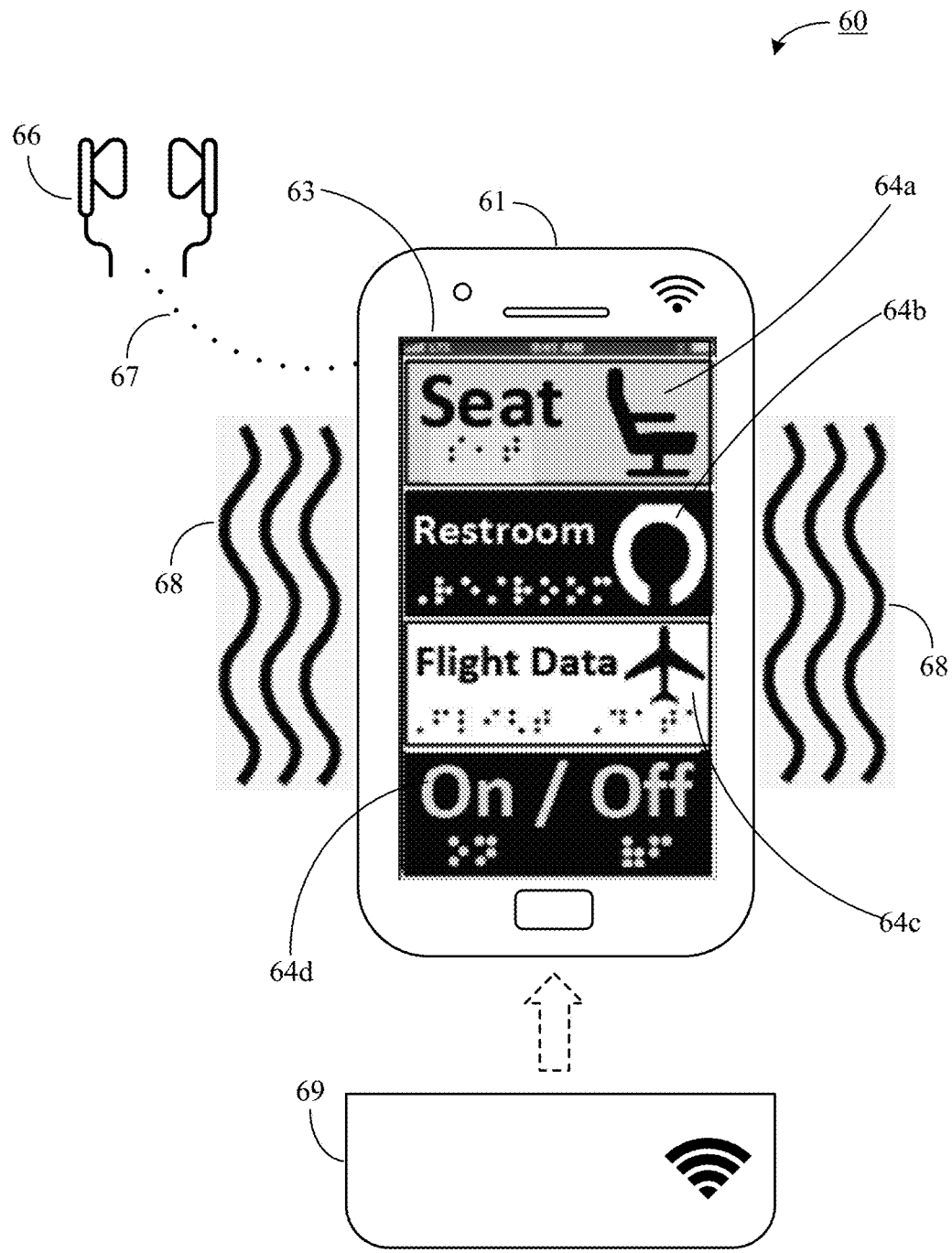
FIG. 6 is a diagram illustrating an example of a client device for use in a wayfinding assistance system according to one or more embodiments.

FIG. 6 is a diagram illustrating an example of a client device 60 for use in a wayfinding assistance system according to one or more embodiments, with reference to components and features described herein including but not limited to the figures and associated description. The client device 60 can correspond to an example of a client device 15 used in the wayfinding assistance system 10 (FIGS. 1A-1B, already discussed), although other client devices can also be used with the wayfinding assistance system 10. The client device 60 includes a mobile device 61 which can be, e.g., a smart phone adapted for use as a client device with features as described herein. The client device 60 includes an application (not shown) which is installed in the mobile device 61 to provide the functionality for use as described herein with the wayfinding assistance system (such as, e.g., the wayfinding assistance system 10). For example, the client application can correspond to the client application 18 (FIGS. 1A-1B, already discussed).

The mobile device 61 can include a haptic interface 63. The haptic interface 63 can include a set of braille buttons 64 (or haptic regions) including, e.g., braille buttons 64*a*, 64*b*, 64*c*, and 64*d*). In examples, the haptic interface 63 can include an overlay placed on a front surface of a mobile phone or smart phone. The braille buttons 64 can include braille components providing identifiers for each button or region. When any braille button 64 is pressed, the client device 60 responds by providing audible information and/or haptic signals responsive to the button. For example, upon pressing the braille button 64*a* the client device 60 can provide information regarding the assigned seat, including seat location. Upon pressing the braille button 64*b*, the client device 60 can provide information regarding restrooms or lavatories available in the passenger cabin, including location and status (e.g., open or occupied). For example, if the nearest lavatory is occupied, but another lavatory is open/available, the client device 60 can emit a haptic signal in the form of a code (e.g., vibrations corresponding to a long dash, followed by a short dash, then followed by a long dash) along with an audible statement that the nearest lavatory is occupied, but an alternate lavatory (with location) is open and available for use. Upon pressing the braille button 64*c*, the client device 60 can provide information regarding trip (e.g., flight) data, such as, e.g., arrival time or any other trip information described with reference to information panel 52 (FIGS. 5A-5B, already discussed). Pressing the braille button 64*d*, can turn the client device 60 on or off. Other braille buttons relating to other functions of the client device 60 can be provided. The braille buttons can include raised braille symbols. Additionally, the braille buttons can include other raised outlines, raised text or raised shapes to help locate the button and indicate the function provided by the button. Braille buttons can even be color-coded to assist a visually-impaired passenger (e.g., having some limited sight) identify each button. It will be understood that the button functionality described herein can be provided with other device arrangements and interfaces (e.g., even if braille buttons are not included).

The client device 60 can also include headphones 66 (such as, e.g., ear buds or earphones) to provide audio sounds or signals to the user. The headphones 66 can be connected to the client device 60 via connection 67 such as a standard cord or cable or a wireless connection (e.g., via a Bluetooth connection). The headphones 66 can correspond to headphones 16 (FIGS. 1A-1B, already discussed).

The client device 60 can also include a haptic component (illustrated in FIG. 6 as a vibration wave 68) for providing one or more haptic signals (e.g., vibrations) to the visually-impaired passenger. As an example, the haptic signals (e.g., vibrations) can be more pronounced or emitted at a faster rate as the client device approaches the desired destination. When the client device 60 is near or at the destination location, the haptic signals such as vibrations can turn into a continuous (or near continuous) series of vibrations. In another example, the haptic signals can provide a code (e.g., vibrations for a long dash, followed by a short dash, followed by a long dash) as a way to indicate an alert. In embodiments, the client device 60 can provide a fully-haptic option with only vibrations (e.g., if the visually-impaired passenger also has a severe audible impairment). For example, in lieu of providing audible signals such as spoken words, the client device 60 can provide haptic codes (e.g., different series or groups of vibrations) to indicate a variety of messages.

The client device 60 includes one or more wireless network interfaces for sending and receiving wireless communications. Typical mobile or smart phones adapted for use as the client device 60 can include wireless communications via one or more of cellular networks, WiFi networks, Bluetooth, near-field communication (NFC), etc. In some embodiments, a mobile device 61 (e.g., smart phone adapted for use as with the client device 60) does not include a suitable wireless interface for communication with RFID transmitters; if NFC-enabled, the ability to communicate with RFID transmitters can be limited to only certain types and only very short distances (e.g., a few centimeters). In embodiments where the short-range transmitters and/or mid-range transmitters as described herein are implemented as passive or active RFID transmitters, the mobile device 61 can require an external adapter for communicating with the RFID transmitters. In some embodiments, an adapter 69 (such as, e.g., a sleeve or other similar adapter) can be attached to an end of the mobile device 61 to provide a wireless interface for communicating with the RFID transmitters. Examples of an adapter 69 providing RFID wireless connectivity to a smart phone include the U Grok It smartphone RFID reader/writer or the iCarte smartphone RFID reader.

Figure 7A:
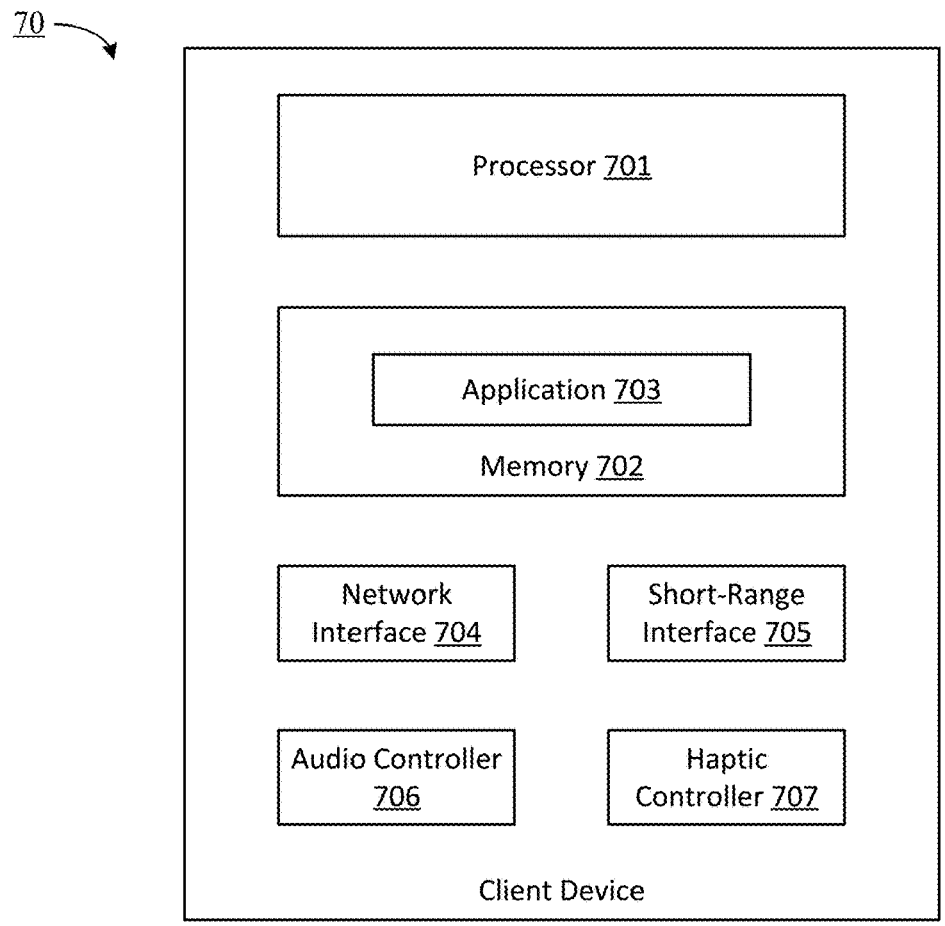
FIG. 7A and 7B provide diagrams illustrating an example of a client device for use in a wayfinding assistance system according to one or more embodiments.

FIG. 7A is a block diagram illustrating an example of a client device 70 for use in a wayfinding assistance system according to one or more embodiments, with reference to components and features described herein including but not limited to the figures and associated description. The client device 70 can correspond to an example of a client device 15 used in the wayfinding assistance system 10 (FIGS. 1A-1B, already discussed). The client device 70 can correspond to the client device 60 (FIG. 6, already discussed). The client device 70 can include a processor 701. The processor 701 can include one or more processing devices such as a central processing unit (CPU), microprocessor, reduced instruction set computer (RISC) processor, application specific integrated circuit (ASIC), etc., and can include associated processing circuitry. The processor 701 can include, or be connected to, non-transitory memory 702 storing executable instructions and/or data, as necessary or appropriate to control, operate or interface with the other features of the client device 70, including an application 703. The processor 701 (including any associated processing circuitry) can contain additional components including processors, memories, error and parity/cyclic redundancy check (CRC) checkers, data encoders, anticollision algorithms, controllers, command decoders, security primitives and tamperproofing hardware, as necessary or appropriate to perform the functions described herein.

The memory 702 can include a read-only memory, write-once read-multiple memory and/or read/write memory, e.g., random access memory (RAM), read only memory (ROM), and electrically erasable programmable read only memory (EEPROM). The memory 702 can store the application 703. The memory 702 can also store an operating system that is native to the client device 70 (e.g., a smart phone operating system such as iOS or the Android operating system). One or more components of the client device 70 can also interface with the native operating system for the device.

The application 703 includes computer or machine instructions suitable for causing the client device 70 to perform the client device functions described herein, including client device functions described with reference to the client device 15 (FIGS. 1A-1B) and/or the client device 60 (FIG. 6). The application 703 may also be configured to provide a user interface via a display (not shown) for a user of the client device, in the event that a visually-impaired passenger using the device has some ability to read the device.

The network interface 704 can include wired or wireless data communication capability. These capabilities can support data communication with a wired or wireless communication network, including the Internet, a cellular network, a wide area network, a local area network, a wireless personal area network, a wide body area network, any other wired or wireless network for transmitting and receiving a data signal, or any combination thereof. Such network may include, without limitation, telephone lines, fiber optics, IEEE Ethernet 902.3, a wide area network, a local area network, a wireless personal area network, a wide body area network or a global network such as the Internet.

The short-range communications interface 705 can support communication via a short-range wireless communication field, such as, e.g., NFC, RFID, or Bluetooth. The short-range communications interface 705 can include a reader, such as a mobile device NFC reader. The short-range communications interface 705 can be incorporated into the network interface 704, or can be provided as a separate interface (including, e.g., as an external sleeve or adapter).

The audio controller 706 provides audio signals as an audio output for the client device 70. The audio controller 706 can interface with the application 703 to convert signals or code into speech (such as, e.g., text-to-speech technology). In some examples, the audio controller interfaces with the application 703 to translate signals, code or speech from one language into a native language spoken and understood by a visually-impaired passenger.

The haptic controller 707 provides vibrations or other tactile feedback for the client device 70. The haptic controller 707 can interface with the application 703 to convert signals or code into haptic signals (e.g., vibrations) provided as sole output or to accompany audio output of the client device. Further details regarding vibration output under the control of the haptic controller 707 are provided with reference to FIG. 7B herein.

Additionally, some or all components in the client device 60 or the client device 70 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the client device 60 or the client device 70 can be implemented in one or more modules as a set of program or logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the client device 60 or the client device 70 (including the application 703) can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 7B:
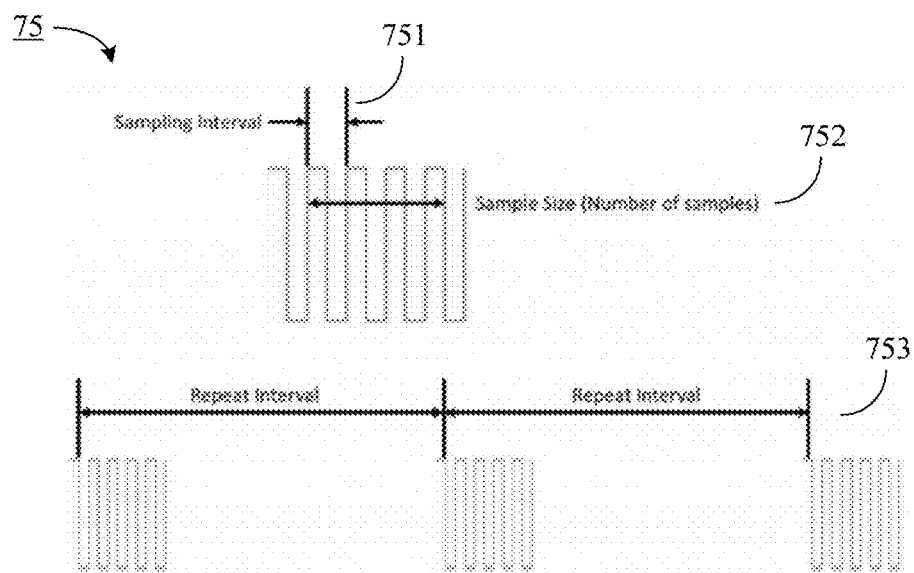

FIG. 7B is a diagram 75 illustrating an example of vibration signals provided as haptic signals by the client device 70 according to one or more embodiments, with reference to components and features described herein including but not limited to the figures and associated description. As shown in FIG. 7B, vibration signals include a sampling interval 751 (e.g., pulse width or period), a burst sample size 752 (e.g., number of samples or pulses in a burst), and a burst interval 753 (e.g., repeat interval or interval between bursts). In some embodiments the height of each pulse or burst can vary, indicative of a strength of the vibrations. In some embodiments, a strength of vibration can be provided by varying the burst sample size or the burst period. In some embodiments, the burst sample size and/or the burst period can be used (e.g., modified or modulated, etc.) to provide a haptic code to the visually-impaired passenger. In some embodiments, the burst period can be shortened (e.g., vibrations appear to increase in speed or frequency) to indicate that the visually-impaired passenger is getting closer to a desired destination (e.g., assigned seat, or lavatory).

FIG. 8 provides a flow diagram illustrating an example method 80 of operating a client device for use in a wayfinding assistance system according to one or more embodiments, with reference to components and features described herein including but not limited to the figures and associated description. The method 80 can be performed by a client application executing (or running) on a client device such as, e.g., the client application 18 executing on the client device 15 and/or the application 703 executing on the client device 70. More particularly, the method 80 can be implemented in one or more modules as a set of program or logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof The method 80 can include receiving, responsive to passing within a range of one of a plurality of short-range transmitters, a first transmission from the one of the plurality of short-range transmitters, as illustrated in processing block 81. Illustrated processing block 82 provides for emitting one or more of a first audible signal or a first haptic signal, based on the first transmission, as wayfinding assistance to a user of the client device. In embodiments, the wayfinding assistance includes indicating a seat row number corresponding to a respective waypoint as the user of the client device passes within the range of the one of the plurality of short-range transmitters. In some embodiments, the method 80 includes retrieving a seating configuration for the passenger cabin, as shown in illustrated processing block 83, and determining the seat row number corresponding to the respective waypoint based on the seating configuration, as shown in illustrated processing block 84. In some embodiments, the method 80 includes receiving a second transmission from a first mid-range transmitter at processing block 85, and emitting one or more of a second audible signal or a second haptic signal indicating at least one of a status of the service area or a location of the service area relative to the client device at processing block 86. In some embodiments, the method 80 includes receiving a third transmission from a second mid-range transmitter at processing block 87, and emitting one or more of a third audible signal or a third haptic signal indicating information regarding the aircraft, the transit vehicle or the vessel at processing block 88.

Figure 9:
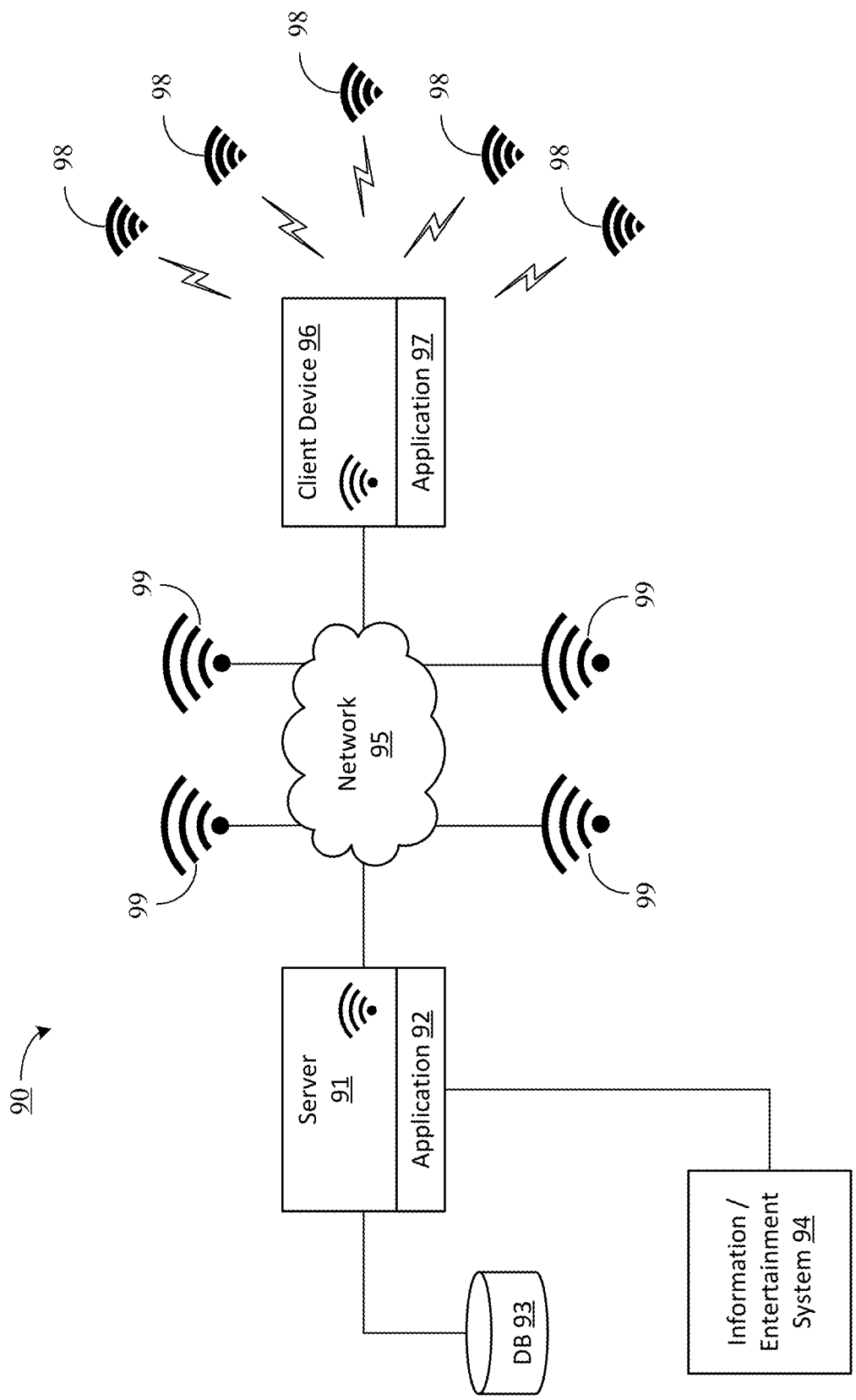
FIG. 9 provides a block diagram illustrating an example of a wayfinding assistance system according to one or more embodiments.

FIG. 9 provides a block diagram illustrating an example of a wayfinding assistance system 90 according to one or more embodiments, with reference to components and features described herein including but not limited to the figures and associated description. The wayfinding assistance system 90 includes a server 91 executing a server application 92, a database 93, an information and entertainment system 94, a network 95, a client device 96 executing a client application 97, and a set of short-range transmitters 98. The wayfinding assistance system 90 can also include one or more mid-range transmitters 99.

The server 91 can include one or more processors (such as, e.g., a CPU, a microprocessor, a RISC processor, an ASIC, etc.,) which are coupled to memory. The server 91 can be configured as a central system, server or platform to control and call various data at different times to execute a plurality of workflow actions. The server 91 can be a dedicated server computer, such as bladed servers, or can include a personal computer, laptop computer, notebook computers palm top computer, network computer, mobile device, or any processor-controlled device capable of supporting the wayfinding assistance system 90. The server 91 is configured for data communication (such as, e.g., via a network connection) with one or more devices, such as the client device 96. The server 91 can include, or be connected to, memory storing executable instructions and/or data, including the server application 92. The server application 92 includes instructions to operate the server 91 causing the server 91 to perform any or all of the server functions described herein.

The server 91 can be configured for data communication (such as, e.g., via a connection) with one or more databases, such as the database 93. The database 93 can be a relational or non-relational database, or a combination of more than one database. In some example embodiments, the server 91 can incorporate the database 93. In some example embodiments, the database 93 can be physically separate and/or remote from the server 91, located in another server, on a cloud-based platform, or in any storage device that is in data communication with the server 91. The database 93 contains data pertinent to providing wayfinding assistance, and can include such data as passenger cabin configurations, seat assignments, service area locations, etc.

The information and entertainment system 94 can include any existing information or entertainment system resident in the transportation mode. In some embodiments, the information and entertainment system 94 provides a link or application programming interface (API) for communication with a resident information and entertainment system to provide for submitting queries and content retrieval. In an example, for an aircraft, the information and entertainment system 94 can include, or be connected to, an in-flight information and entertainment system.

The network 95 is configured for wireless and/or wired communications within a passenger cabin, such as the passenger cabin 11 (FIG. 1, already discussed). The network 95 can include one or more of a wireless network, a wired network or any combination of wireless network and wired network, and can be configured to connect the client device 96 to the server 91. For example, the network 95 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, digital advanced mobile phone service (D-AMPS), Wi-Fi, Fixed Wireless Data, IEEE 802.11b, 802.15.1, 802.11n and 802.11h, Bluetooth, NFC, Radio Frequency Identification (RFID), Wi-Fi, and/or the like. In addition, the network 95 can include telephone lines, fiber optics, IEEE Ethernet 902.3, a wide area network, a wireless personal area network, a LAN, or a global network such as the Internet. In addition, the network 95 can support an Internet network, a wireless communication network, a cellular network, or the like, or any combination thereof. The network 95 can further include one network, or any number of the exemplary types of networks mentioned above, operating as a stand-alone network or in cooperation with each other. The network 95 can utilize one or more protocols of one or more network elements to which they are communicatively coupled.

The client device 96 can include any type of mobile, handheld or portable communications device, and can include a network-enabled computer. The client device 96 can correspond to any one of the client device 15 (FIGS. 1A-1B, already discussed), the client device 60 (FIG. 6, already discussed), and/or the client device 70 (FIG. 7, already discussed). The client device 96 is configured to execute or run a client application 97, which can correspond to the client application 18 (FIGS. 1A-1B, already discussed) and/or the application 703 (FIG. 7, already discussed). The client application 97 includes instructions to operate the client device 96 causing the client device 96 to perform any or all of the client device functions described herein.

The set of short-range transmitters 98 are distributed within a passenger cabin, such as the passenger cabin 11 (FIG. 1, already discussed), and correspond to the set of short-range transmitters 12 (FIG. 1, already discussed). Each short-range transmitter 98 can be of any type of transmitter appropriate for short-range communications within the passenger cabin, such as, e.g., a passive RFID transmitter. Each short-range transmitter 98 can be placed within a passenger cabin such as described above with reference to FIGS. 1A-1B and FIG. 2.

The one or more mid-range transmitters 99 can be placed within the passenger cabin, such as the passenger cabin 11 (FIG. 1, already discussed), and correspond to any one of the mid-range transmitters 13 or 14 (FIG. 1, already discussed). Each mid-range transmitter 99 can be of any type of transmitter appropriate for mid-range communications within the passenger cabin, such as, e.g., a passive RFID transmitter or a WiFi transmitter. Each mid-range transmitter can be placed within a passenger cabin such as described above with reference to FIGS. 1A-1B and FIGS. 3, 4 and 5. In addition, the one or more mid-range transmitters 99 are configured for data communication with the server 91 and/or the client device 96 via the network 95, and can be distributed within the passenger cabin to provide connectivity via network 95 to all portions of the passenger cabin.

In operation, the wayfinding assistance system 90 provides wayfinding assistance to a visually-impaired passenger using the client device 96. In examples, the wayfinding assistance system 90 operates in a manner similar to the wayfinding assistance system 10 as described herein (including FIGS. 1A-1B, already discussed). In particular, the interactions between the client device 96 and the short-range transmitters 98 can be the same as the interactions between the client device 15 and the short-range transmitters 12 as described herein (including FIGS. 1A-1B, already discussed). Accordingly, the similarities in operation will not be repeated here, but differences in operation of the wayfinding assistance system 90 will be discussed.

For example, in embodiments, when interacting with the short-range transmitters 98, the client application 97 causes the client device 96 to be in communication with the server 91 via the network 95. Upon receiving a signal with waypoint identifier from a short-range transmitter 98, the client device 96 sends the received waypoint identifier to the server 91. The server 91 determines the waypoint information (e.g., seat row number) based on the waypoint identifier and sends the waypoint information to the client device 96 which, in turn, emits an audible and/or haptic signal to the visually-impaired passenger as wayfinding assistance. In embodiments, the server 91 can determine the waypoint information based on the waypoint identifier such as, e.g., by retrieving a seating configuration for the passenger cabin and looking up the waypoint identifier (e.g., corresponding to a seat row number) in the seating configuration. The seating configuration can be stored, e.g., in the database 93.

As another example, in embodiments, the server 91 is in communication with service areas such as, e.g., lavatories, food service counters, etc. described with reference to FIGS. 1A-1B. Communication between the server 91 and any one or more service areas can be accomplished via the network 95 in communication with one or more mid-range transmitters 99. In embodiments, the server 91 can be connected to one or more service areas via another network (wired or wireless). To obtain information regarding a service area (e.g., a lavatory), the client device 96 sends a query for service area information to the server 91. In some embodiments, the client device 96 can receive a transmission, from a corresponding mid-range transmitter 99, with a waypoint identifier for the service area; the client device 96 then sends a query with the identifier for the service area to the server 91. The server 91 can determine information regarding the service area(s) and send the information to the client device 96 which, in turn, emits an audible and/or haptic signal to the visually-impaired passenger as wayfinding assistance. In embodiments, the server 91 can determine the service area location based on the waypoint identifier such as, e.g., by retrieving a service area configuration for the passenger cabin and looking up the waypoint identifier (e.g., corresponding to a service area such as a lavatory) in the service area configuration. The service area configuration can be stored, e.g., in the database 93. In embodiments, the server 91 maintains an updated status for each service area, and sends the status information to the client device 96 in response to a query. For example, when the service area is a lavatory, the server 91 maintains a status for the lavatory (e.g., open or occupied). In embodiments, the server 91 can obtain information relating to seating configuration, service area configuration and/or service area status from the information and entertainment system 94.

Figure 10:
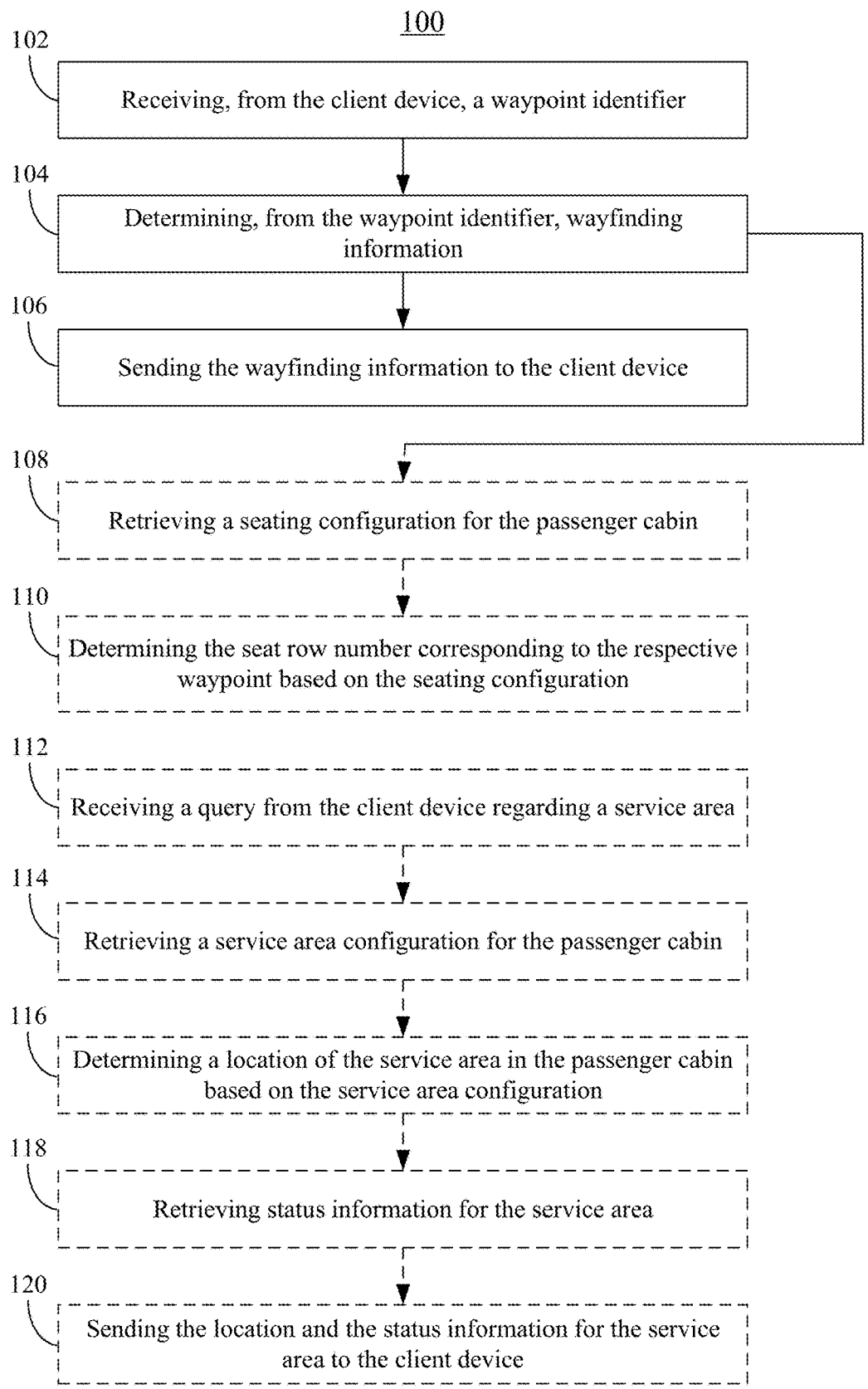
FIG. 10 provides a flow diagram illustrating an example method of operating a server for use in a wayfinding assistance system according to one or more embodiments.

FIG. 10 provides a flow diagram illustrating an example method 100 of operating a server for use in a wayfinding assistance system according to one or more embodiments, with reference to components and features described herein including but not limited to the figures and associated description. The method 100 can be performed by a server application executing (or running) on a server such as, e.g., the server application 92 executing on the server 91. More particularly, the method 100 can be implemented in one or more modules as a set of program or logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof The method 100 can include receiving, from the client device, a waypoint identifier, as illustrated in processing block 102. Illustrated processing block 104 provides for determining, from the waypoint identifier, wayfinding information. Illustrated processing block 106 provides for sending the wayfinding information to the client device. In embodiments, the wayfinding information includes a seat row number corresponding to a respective waypoint as the user of the client device passes within a range of one of the plurality of short-range transmitters. In some embodiments, the method 100 includes retrieving a seating configuration for the passenger cabin, as shown in illustrated processing block 108, and determining the seat row number corresponding to the respective waypoint based on the seating configuration, as shown in illustrated processing block 110. In some embodiments, illustrated processing blocks 108 and 110 can be substituted for illustrated processing block 104. In some embodiments, the method 100 includes, at illustrated processing block 112, receiving a query from the client device regarding a service area. Illustrated processing block 114 provides for retrieving a service area configuration for the passenger cabin, and determining a location of the service area in the passenger cabin based on the service area configuration, as shown in illustrated processing block 116. Illustrated processing block 118 provides for retrieving status information for the service area. Illustrated processing block 120 provides for sending the location and the status information for the service area to the client device.

Embodiments of each of the above systems, devices, components and/or methods, including the wayfinding assistance system 10, the client device 15, the client device 60, the client device 70, the method 80, the wayfinding assistance system 90, the method 100, and/or portions thereof, and/or any other system components, can be implemented in hardware, software, or any suitable combination thereof. For example, hardware implementations can include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C#or the like and conventional procedural programming languages, such as the "C" programming language or similar programming languages.

Additional Notes and Examples

Further, the disclosure comprises additional examples as detailed in the following clauses.

Clause 1 includes a wayfinding assistance system for visually-impaired passengers, comprising a plurality of short-range transmitters distributed within a passenger cabin, the passenger cabin situated within one of an aircraft, a transit vehicle or a vessel, wherein each short-range transmitter of the plurality of short-range transmitters is located proximate to a respective waypoint in the passenger cabin, and wherein each short-range transmitter of the plurality of short-range transmitters is configured to transmit a short-range wireless signal within a short-range field, the short-range wireless signal including a waypoint identifier to identify the respective waypoint in the passenger cabin, and a non-transitory machine-readable medium storing a client application comprising instructions for execution on a client device, wherein the client device is configured for communication with each of the plurality of short-range transmitters, and wherein the instructions, when executed, cause the client device to responsive to passing within a range of one of the plurality of short-range transmitters, receive a first transmission from the one of the plurality of short-range transmitters, and emit one or more of a first audible signal or a first haptic signal, based on the first transmission, as wayfinding assistance to a user of the client device.

Clause 2 includes the wayfinding assistance system of Clause 1, wherein each of the short-range transmitters is a passive Radio Frequency Identification (RFID) transmitter.

Clause 3 includes the wayfinding assistance system of Clause 1 or 2, wherein each respective waypoint is a seat row in the passenger cabin.

Clause 4 includes the wayfinding assistance system of Clause 3, wherein the wayfinding assistance includes indicating a seat row number corresponding to the respective waypoint as the user of the client device passes within the range of the one of the plurality of short-range transmitters.

Clause 5 includes the wayfinding assistance system of Clause 4, wherein the instructions, when executed, cause the client device to retrieve a seating configuration for the passenger cabin, and determine the seat row number corresponding to the respective waypoint based on the seating configuration.

Clause 6 includes the wayfinding assistance system of any of Clauses 1-5, further comprising a first mid-range transmitter located proximate to a service area in the passenger cabin, wherein the first mid-range transmitter is configured to transmit a first mid-range wireless signal providing at least one of a status of or a location of the service area, wherein the client device is configured for communication with the first mid-range transmitter, and wherein the instructions, when executed, further cause the client device to receive a second transmission from the first mid-range transmitter, and emit one or more of a second audible signal or a second haptic signal indicating at least one of the status of the service area or the location of the service area relative to the client device.

Clause 7 includes the wayfinding assistance system of Clause 6, wherein the first mid-range transmitter is an active RFID transmitter.

Clause 8 includes the wayfinding assistance system of Clause 6, wherein the first mid-range transmitter is connected to a status communication signal for the service area.

Clause 9 includes the wayfinding assistance system of any of Clauses 1-8, wherein the instructions, when executed, cause the client device to retrieve a service area configuration for the passenger cabin, and determine the location of the service area relative to the client device based on the service area configuration and the second transmission from the first mid-range transmitter.

Clause 10 includes the wayfinding assistance system of any of Clauses 1-9, further comprising a second mid-range transmitter located in the passenger cabin, wherein the second mid-range transmitter is configured to transmit a second mid-range wireless signal providing information regarding the aircraft, the transit vehicle or the vessel, wherein the client device is configured for communication with the second mid-range transmitter, and wherein the instructions, when executed, further cause the client device to receive a third transmission from the second mid-range transmitter, and emit one or more of a third audible signal or a third haptic signal indicating the information regarding the aircraft, the transit vehicle or the vessel.

Clause 11 includes the wayfinding assistance system of any of Clauses 1-10, wherein the second mid-range transmitter is an active RFID transmitter.

Clause 12 includes the wayfinding assistance system of any of Clauses 1-11, wherein the second mid-range transmitter is connected to an information communication signal for the passenger cabin.

Clause 13 includes the wayfinding assistance system of any of Clauses 1-12, wherein the service area is a lavatory, wherein the status of the service area is a status of the lavatory, wherein the location of the service area is a location of the lavatory, and wherein the information regarding the aircraft, the transit vehicle or the vessel includes one or more of a seat belt fasten status or a food service status.

Clause 14 includes the wayfinding assistance system of Clause 4, wherein the first haptic signal includes an indication of the seat row number relative to a seat row number assigned to the user of the client device.

Clause 15 includes the wayfinding assistance system of any of Clauses 1-14, further comprising a plurality of terminal transmitters distributed within a passenger terminal associated with the aircraft, the transit vehicle or the vessel, wherein each terminal transmitter of the plurality of terminal transmitters is located proximate to a respective waypoint in the passenger terminal, and wherein each terminal transmitter of the plurality of terminal transmitters is configured to transmit a wireless signal identifying the respective waypoint in the passenger terminal, and wherein the client device is configured for communication with each of the plurality of terminal transmitters, and wherein the instructions, when executed, cause the client device to responsive to passing within a range of a one of the plurality of terminal transmitters, receive a fourth transmission from the one of the plurality of terminal transmitters, and emit one or more of a fourth audible signal or a fourth haptic signal, based on the fourth transmission, as terminal wayfinding assistance to the user of the client device.

Clause 16 includes the system of wayfinding assistance Clause 15, wherein the terminal wayfinding assistance includes information directing the user of the client device from the passenger terminal to the aircraft, the transit vehicle or the vessel.

Clause 17 includes a wayfinding assistance method comprising providing a plurality of short-range transmitters distributed within a passenger cabin, the passenger cabin situated within one of an aircraft, a transit vehicle or a vessel, wherein each short-range transmitter of the plurality of short-range transmitters is located proximate to a respective waypoint in the passenger cabin, and wherein each short-range transmitter of the plurality of short-range transmitters is configured to transmit a short-range wireless signal within a short-range field, the short-range wireless signal including a waypoint identifier to identify the respective waypoint in the passenger cabin, and providing a non-transitory machine-readable medium storing a client application comprising instructions for execution on a client device, wherein the client device is configured for communication with each of the plurality of short-range transmitters, and wherein the instructions, when executed, cause the client device to responsive to passing within a range of one of the plurality of short-range transmitters, receive a first transmission from the one of the plurality of short-range transmitters, and emit one or more of a first audible signal or a first haptic signal, based on the first transmission, as wayfinding assistance to a user of the client device.

Clause 18 includes the wayfinding assistance method of Clause 17, wherein each respective waypoint is a seat row in the passenger cabin, and wherein the wayfinding assistance includes indicating a seat row number corresponding to the respective waypoint as the user of the client device passes within the range of the one of the plurality of short-range transmitters.

Clause 19 includes the wayfinding assistance method of Clause 17 or 18, wherein the instructions, when executed, cause the client device to retrieve a seating configuration for the passenger cabin, and determine the seat row number corresponding to the respective waypoint based on the seating configuration.

Clause 20 includes the wayfinding assistance method of any of Clauses 17-19, further comprising providing a first mid-range transmitter located proximate to a service area in the passenger cabin, wherein the first mid-range transmitter is configured to transmit a first mid-range wireless signal providing at least one of a status of or a location of the service area, wherein the client device is configured for communication with the first mid-range transmitter, and wherein the instructions, when executed, further cause the client device to receive a second transmission from the first mid-range transmitter, and emit one or more of a second audible signal or a second haptic signal indicating at least one of the status of the service area or the location of the service area relative to the client device.

Clause 21 includes the wayfinding assistance method of any of Clauses 17-20, wherein the instructions, when executed, cause the client device to retrieve a service area configuration for the passenger cabin, and determine a location of the service area relative to the client device based on the service area configuration and the transmission from the first mid-range transmitter.

Clause 22 includes the wayfinding assistance method of any of Clauses 17-20, further comprising providing a second mid-range transmitter located in the passenger cabin, wherein the second mid-range transmitter is configured to transmit a second mid-range wireless signal providing information regarding the aircraft, the transit vehicle or the vessel, wherein the client device is configured for communication with the second mid-range transmitter, and wherein the instructions, when executed, further cause the client device to receive a third transmission from the second mid-range transmitter, and emit one or more of a third audible signal or a third haptic signal indicating the information regarding the aircraft, the transit vehicle or the vessel.

Clause 23 includes the wayfinding assistance method of any of Clauses 17-22, wherein each of the short-range transmitters is a passive Radio Frequency Identification (RFID) transmitter, wherein the first mid-range transmitter is an active RFID transmitter, and wherein the second mid-range transmitter is an active RFID transmitter.

Clause 24 includes the wayfinding assistance method of any of Clauses 17-23, wherein the first mid-range transmitter is connected to a status communication signal for the service area, wherein the second mid-range transmitter is connected to an information communication signal for the passenger cabin, wherein the service area is a lavatory, wherein the status of the service area is a status of the lavatory, wherein the location of the service area is a location of the lavatory, and wherein the information regarding the aircraft, the transit vehicle or the vessel includes one or more of a seat belt fasten status or a food service status.

Clause 25 includes the wayfinding assistance method of any of Clauses 17-24, wherein the first haptic signal includes an indication of the seat row number relative to a seat row number assigned to the user of the client device.

Clause 26 includes at least one non-transitory computer readable medium comprising instructions which, when executed by a client device, cause the client device to responsive to passing within a range of one of a plurality of short-range transmitters, receive a first transmission from the one of the plurality of short-range transmitters, and emit one or more of a first audible signal or a first haptic signal, based on the first transmission, as wayfinding assistance to a user of the client device, wherein the plurality of short-range transmitters is distributed within a passenger cabin, the passenger cabin situated within one of an aircraft, a transit vehicle or a vessel, wherein each short-range transmitter of the plurality of short-range transmitters is located proximate to a respective waypoint in the passenger cabin, and wherein each short-range transmitter of the plurality of short-range transmitters is configured to transmit a short-range wireless signal within a short-range field, the short-range wireless signal including a waypoint identifier to identify the respective waypoint in the passenger cabin.

Clause 27 includes the at least one non-transitory computer readable medium of Clause 26, wherein each respective waypoint is a seat row in the passenger cabin, and wherein the wayfinding assistance includes indicating a seat row number corresponding to the respective waypoint as the user of the client device passes within the range of the one of the plurality of short-range transmitters.

Clause 28 includes the at least one non-transitory computer readable medium of Clause 26 or 27, wherein the instructions, when executed, cause the client device to retrieve a seating configuration for the passenger cabin, and determine the seat row number corresponding to the respective waypoint based on the seating configuration.

Clause 29 includes the at least one non-transitory computer readable medium of any of Clauses 26-28, wherein the instructions, when executed, further cause the client device to receive a second transmission from a first mid-range transmitter, and emit one or more of a second audible signal or a second haptic signal indicating at least one of a status of a service area or a location of the service area relative to the client device, wherein the first mid-range transmitter is located proximate to the service area in the passenger cabin, and wherein the first mid-range transmitter is configured to transmit a first mid-range wireless signal providing at least one of the status of or the location of the service area.

Clause 30 includes the at least one non-transitory computer readable medium of any of Clauses 26-29, wherein the instructions, when executed, cause the client device to: retrieve a service area configuration for the passenger cabin, and determine the location of the service area relative to the client device based on the service area configuration and the second transmission from the first mid-range transmitter.

Clause 31 includes the at least one non-transitory computer readable medium of any of Clauses 26-30, wherein the instructions, when executed, further cause the client device to receive a third transmission from a second mid-range transmitter, and emit one or more of a third audible signal or a third haptic signal indicating information regarding the aircraft, the transit vehicle or the vessel, wherein the second mid-range transmitter is located in the passenger cabin, and wherein the second mid-range transmitter is configured to transmit a second mid-range wireless signal providing the information regarding the aircraft, the transit vehicle or the vessel.

Clause 32 includes the at least one non-transitory computer readable medium of any of Clauses 26-31, wherein the first mid-range transmitter is connected to a status communication signal for the service area, wherein the second mid-range transmitter is connected to an information communication signal for the passenger cabin, wherein the service area is a lavatory, wherein the status of the service area is a status of the lavatory, wherein location of the service area is a location of the lavatory, and wherein the information regarding the aircraft, the transit vehicle or the vessel includes one or more of a seat belt fasten status or a food service status.

Clause 33 includes the at least one non-transitory computer readable medium of any of Clauses 26-27, wherein the first haptic signal includes an indication of the seat row number relative to a seat row number assigned to the user of the client device.

Clause 34 includes a wayfinding assistance system for visually-impaired passengers, comprising a plurality of short-range transmitters distributed within a passenger cabin, the passenger cabin situated within one of an aircraft, a transit vehicle or a vessel, wherein each short-range transmitter of the plurality of short-range transmitters is located proximate to a respective waypoint in the passenger cabin, and wherein each short-range transmitter of the plurality of short-range transmitters is configured to transmit a short-range wireless signal within a short-range field, the short-range wireless signal including a waypoint identifier to identify the respective waypoint in the passenger cabin, a server configured for data communication with a client device via a wireless network, the server comprising a processor and memory coupled to the processor, the memory storing a server application comprising server instructions which, when executed by the processor, cause the server to receive, from the client device, the waypoint identifier, determine, from the waypoint identifier, wayfinding information, and send the wayfinding information to the client device, and a non-transitory machine-readable medium storing a client application comprising client instructions for execution on the client device, wherein the client device is configured for communication with the server, via the wireless network, and with each of the plurality of short-range transmitters, and wherein the client instructions, when executed, cause the client device to responsive to passing within a range of one of the plurality of short-range transmitters, receive, from the one of the plurality of short-range transmitters, a first transmission including the waypoint identifier, send, to the server, the waypoint identifier, receive, from the server, the wayfinding information, and emit one or more of a first audible signal or a first haptic signal, based on the wayfinding information, as wayfinding assistance to a user of the client device.

Clause 35 includes the wayfinding assistance system of Clause 34, wherein each of the short-range transmitters is a passive Radio Frequency Identification (RFID) transmitter.

Clause 36 includes the wayfinding assistance system of Clause 34 or 35, wherein each respective waypoint is a seat row in the passenger cabin, and wherein the wayfinding assistance includes indicating a seat row number corresponding to the respective waypoint as the user of the client device passes within the range of the one of the plurality of short-range transmitters.

Clause 37 includes the wayfinding assistance system of any of Clauses 34-36, wherein the server instructions, when executed, cause the server to retrieve a seating configuration for the passenger cabin, and determine the seat row number corresponding to the respective waypoint based on the seating configuration.

Clause 38 includes the wayfinding assistance system of Clause 34, wherein the server instructions, when executed, cause the server to receive a query from the client device regarding a service area in the passenger cabin, retrieve a service area configuration for the passenger cabin, determine a location of the service area in the passenger cabin based on the service area configuration, retrieve status information for the service area, and send the location and the status information for the service area to the client device.

Clause 39 includes the wayfinding assistance system of any of Clauses 34-38, further comprising a mid-range transmitter located proximate to the service area, wherein the mid-range transmitter is configured to transmit a mid-range wireless signal providing the location of the service area, wherein the client device is configured for communication with the mid-range transmitter, and wherein the client instructions, when executed, further cause the client device to receive a second transmission from the mid-range transmitter, and emit one or more of a second audible signal or a second haptic signal indicating the location of the service area relative to the client device.

Clause 40 includes the wayfinding assistance system of any of Clauses 34-39, wherein the mid-range transmitter is an active RFID transmitter.

Clause 41 includes the wayfinding assistance system of any of Clauses 34-40, wherein the service area is a lavatory, wherein the status information for the service area is a status of the lavatory, and wherein the location of the service area is a location of the lavatory.

Clause 42 includes the wayfinding assistance system of any of Clauses 34-41, wherein the server instructions, when executed, cause the server to send information regarding the aircraft, the transit vehicle or the vessel to the client device.

Clause 43 includes the wayfinding assistance system of any of Clauses 34-42, wherein the information regarding the aircraft, the transit vehicle or the vessel includes one or more of a seat belt fasten status or a food service status.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A wayfinding assistance system for visually-impaired passengers, comprising:
   a plurality of short-range transmitters distributed within a passenger cabin, the passenger cabin situated within one of an aircraft, a transit vehicle or a vessel,
      wherein each short-range transmitter of the plurality of short-range transmitters is located proximate to a respective waypoint in the passenger cabin, and
      wherein each short-range transmitter of the plurality of short-range transmitters is configured to transmit a short-range wireless signal within a short-range field, the short-range wireless signal including a waypoint identifier to identify the respective waypoint in the passenger cabin;
   a first mid-range transmitter located in the passenger cabin, wherein the first mid-range transmitter is configured to transmit a first mid-range wireless signal providing information regarding the aircraft, the transit vehicle or the vessel,
      wherein the information regarding the aircraft, the transit vehicle or the vessel includes one or more of information regarding a current trip of the aircraft, the transit vehicle or the vessel, or a current seat belt status, wherein the information regarding the current trip includes at least one of a flight or route number, a destination city, an arrival time, or a local time; and
   a non-transitory machine-readable medium storing a client application comprising instructions for execution on a client device, wherein the client device is configured for communication with each of the plurality of short-range transmitters and with the first mid-range transmitter, and wherein the instructions, when executed, cause the client device to:
      responsive to passing within a range of one of the plurality of short-range transmitters, receive a first transmission from the one of the plurality of short-range transmitters;
      emit one or more of a first audible signal or a first haptic signal, based on the first transmission, as wayfinding assistance to a user of the client device;
      receive a second transmission from the first mid-range transmitter including the information regarding the aircraft, the transit vehicle or the vessel; and emit one or more of a second audible signal or a second haptic signal indicating the information regarding the aircraft, the transit vehicle or the vessel.

2. The wayfinding assistance system of claim 1, wherein each of the short-range transmitters is a passive Radio Frequency Identification (RFID) transmitter.

3. The wayfinding assistance system of claim 1, wherein each respective waypoint is a seat row in the passenger cabin.

4. The wayfinding assistance system of claim 3, wherein the wayfinding assistance includes indicating a seat row number corresponding to the respective waypoint as the user of the client device passes within the range of the one of the plurality of short-range transmitters.

5. The wayfinding assistance system of claim 4, wherein the instructions, when executed, cause the client device to:
 retrieve a seating configuration for the passenger cabin; and
 determine the seat row number corresponding to the respective waypoint based on the seating configuration.

6. The wayfinding assistance system of claim 1, further comprising a second mid-range transmitter located proximate to a service area in the passenger cabin, wherein the second mid-range transmitter is configured to transmit a second mid-range wireless signal providing at least one of a status of or a location of the service area;
 wherein the client device is configured for communication with the second mid-range transmitter, and wherein the instructions, when executed, further cause the client device to:
  receive a third transmission from the second mid-range transmitter; and
  emit one or more of a third audible signal or a third haptic signal indicating at least one of the status of the service area or the location of the service area relative to the client device.

7. The wayfinding assistance systemof claim 6, wherein the second mid-range transmitter is an active RFID transmitter.

8. The wayfinding assistance system of claim 6, wherein the second mid-range transmitter is connected to a status communication signal for the service area.

9. The wayfinding assistance system of claim 6, wherein the instructions, when executed, cause the client device to:
 retrieve a service area configuration for the passenger cabin; and
 determine the location of the service area relative to the client device based on the service area configuration and the third transmission from the second mid-range transmitter.

10. A wayfinding assistance method comprising:
 providing a plurality of short-range transmitters distributed within a passenger cabin, the passenger cabin situated within one of an aircraft, a transit vehicle or a vessel,
  wherein each short-range transmitter of the plurality of short-range transmitters is located proximate to a respective waypoint in the passenger cabin, and
  wherein each short-range transmitter of the plurality of short-range transmitters is configured to transmit a short-range wireless signal within a short-range field, the short-range wireless signal including a waypoint identifier to identify the respective waypoint in the passenger cabin;
 providing a firstmid-range transmitter located in the passenger cabin, wherein the first mid-range transmitter is configured to transmit a first mid-range wireless signal providing information regarding the aircraft, the transit vehicle or the vessel,
  wherein the infoimation regarding the aircraft, the transit vehicle or the vessel includes one or more of info, (nation regarding a current trip of the aircraft, the transit vehicle or the vessel, or a current seat belt status, wherein the information regarding the current trip includes at least one of a flight or route number, a destination city, an arrival time, or a local time; and
 providing a non-transitory machine-readable medium storing a client application comprising instructions for execution on a client device, wherein the client device is configured for communication with each of the plurality of short-range transmitters and with the first mid-range transmitter, and wherein the instructions, when executed, cause the client device to:
  responsive to passing within a range of one of the plurality of short-range transmitters, receive a first transmission from the one of the plurality of short-range transmitters;
  emit one or more of a first audible signal or a first haptic signal, based on the first transmission, as wayfinding assistance to a user of the client device;
  receive a second transmission from the first mid-range transmitter including the infoiniation regarding the aircraft, the transit vehicle or the vessel; and
  emit one or more of a second audible signal or a second haptic signal indicating the information regarding the aircraft, the transit vehicle or the vessel.

11. The wayfinding assistance method of claim 10, wherein each respective waypoint is a seat row in the passenger cabin, and wherein the wayfinding assistance includes indicating a seat row number corresponding to the respective waypoint as the user of the client device passes within the range of the one of the plurality of short-range transmitters.

12. The wayfinding assistance method of claim 11, wherein the instructions, when executed, cause the client device to:
 retrieve a seating configuration for the passenger cabin; and
 determine the seat row number corresponding to the respective waypoint based on the seating configuration.

13. The wayfinding assistance method of claim 10, further comprising providing a second mid-range transmitter located proximate to a service area in the passenger cabin, wherein the second mid-range transmitter is configured to transmit a second mid-range wireless signal providing at least one of a status of or a location of the service area;
 wherein the client device is configured for communication with the second mid-range transmitter, and wherein the instructions, when executed, further cause the client device to:
  receive a third transmission from the second mid-range transmitter; and
  emit one or more of a third audible signal or a third haptic signal indicating at least one of the status of the service area or the location of the service area relative to the client device.

14. The wayfinding assistance method of claim 13, wherein the instructions, when executed, cause the client device to:
 retrieve a service area configuration for the passenger cabin; and determine the location of the service area relative to the client device based on the service area configuration and the third transmission from the second mid-range transmitter.

15. At least one non-transitory computer readable medium comprising instructions which, when executed by a client device, cause the client device to:
    responsive to passing within a range of one of a plurality of short-range transmitters, receive a first transmission from the one of the plurality of short-range transmitters;
    emit one or more of a first audible signal or a first haptic signal, based on the first transmission, as wayfinding assistance to a user of the client device;
    receive a second transmission from a first mid-range transmitter including the infoli iation regarding the aircraft, the transit vehicle or the vessel; and
    emit one or more of a second audible signal or a second haptic signal indicating the information regarding the aircraft, the transit vehicle or the vessel;
    wherein the plurality of short-range transmitters is distributed within a passenger cabin, the passenger cabin situated within one of an aircraft, a transit vehicle or a vessel,
    wherein each short-range transmitter of the plurality of short-range transmitters is located proximate to a respective waypoint in the passenger cabin, and
    wherein each short-range transmitter of the plurality of short-range transmitters is configured to transmit a short-range wireless signal within a short-range field, the short-range wireless signal including a waypoint identifier to identify the respective waypoint in the passenger cabin,
    wherein the first mid-range transmitter is located in the passenger cabin, and is configured to transmit a first mid-range wireless signal providing information regarding the aircraft, the transit vehicle or the vessel, and
    wherein the information regarding the aircraft, the transit vehicle or the vessel includes one or more of information regarding a current trip of the aircraft, the transit vehicle or the vessel, or a current seat belt status, wherein the information regarding the current trip includes at least one of a flight or route number, a destination city, an arrival time, or a local time.

16. The at least one non-transitory computer readable medium of claim 15, wherein each respective waypoint is a seat row in the passenger cabin, and wherein the wayfinding assistance includes indicating a seat row number corresponding to the respective waypoint as the user of the client device passes within the range of the one of the plurality of short-range transmitters.

17. The at least one non-transitory computer readable medium of claim 16, wherein the instructions, when executed, cause the client device to:
    retrieve a seating configuration for the passenger cabin; and
    determine the scat row number corresponding to the respective waypoint based on the seating configuration.

18. The at least one non-transitory computer readable medium of claim 15, wherein the instructions, when executed, further cause the client device to:
    receive a third transmission from a second mid-range transmitter; and
    emit one or more of a third audible signal or a third haptic signal indicating at least one of a status of a service area or a location of the service area relative to the client device,
    wherein the second mid-range transmitter is located proximate to the service area in the passenger cabin, and
    wherein the second mid-range transmitter is configured to transmit a second mid-range wireless signal providing at least one of the status of or the location of the service area.

19. The at least one non-transitory computer readable medium of claim 18, wherein the instructions, when executed, cause the client device to:
    retrieve a service area configuration for the passenger cabin; and
    determine the location of the service area relative to the client device based on the service area configuration and the third transmission from the second mid-range transmitter.

20. The wayfinding assistance system of claim 1, wherein the first mid-range transmitter is coupled or connected to a seat belt indicator signal.

* * * * *

UNITED STATES PATENT AND TRADEMARK OFFICE
CERTIFICATE OF CORRECTION

PATENT NO. : 12,035,200 B2
APPLICATION NO. : 17/663869
DATED : July 9, 2024
INVENTOR(S) : Darren C. McIntosh It is certified that error appears in the above-identified patent and that said Letters Patent is hereby corrected as shown below:

In the Claims

At Column 28, Line 64, "a uscr of the client device" should be --a user of the client device--.

Signed and Sealed this
Thirteenth Day of August, 2024

Katherine Kelly Vidal
*Director of the United States Patent and Trademark Office*